United States Patent
Saini et al.

(10) Patent No.: US 9,369,571 B2
(45) Date of Patent: *Jun. 14, 2016

(54) SYSTEM AND METHOD FOR QUALITY AUTO-BLENDING IN CALL ROUTING

(71) Applicant: Tata Communications (America) Inc., Herndon, VA (US)

(72) Inventors: Aakratee Saini, Monroe Township, NJ (US); Avanish Pande, Spotswood, NJ (US); Joseph F. Conrey, Spring Lake, NJ (US); Roy Ho, Morganville, NJ (US)

(73) Assignee: Tata Communications (America) Inc., Herndon, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/791,521

(22) Filed: Jul. 6, 2015

(65) Prior Publication Data

US 2015/0326735 A1 Nov. 12, 2015

Related U.S. Application Data

(63) Continuation of application No. 14/319,020, filed on Jun. 30, 2014, now Pat. No. 9,077,797, which is a continuation of application No. 13/770,103, filed on Feb. 19, 2013, now Pat. No. 8,787,541.

(51) Int. Cl.
*H04M 15/00* (2006.01)
*H04M 7/00* (2006.01)
(Continued)

(52) U.S. Cl.
CPC .............. *H04M 3/367* (2013.01); *H04M 7/128* (2013.01); *H04M 7/1285* (2013.01); *H04Q 3/66* (2013.01); *H04M 15/8044* (2013.01); *H04Q 2213/13141* (2013.01)

(58) Field of Classification Search
CPC ... H04M 15/00; H04M 15/58; H04M 3/4228; H04M 7/128
USPC .............. 379/112.01, 112.05, 112.1, 220.01, 379/221.01, 221.06, 221.07, 221.14
See application file for complete search history.

(56) References Cited

U.S. PATENT DOCUMENTS 5,999,604 A 12/1999 Walter
7,076,036 B1 7/2006 Johnson
(Continued)

FOREIGN PATENT DOCUMENTS

| CA | 2511382 | 1/2007 |
|---|---|---|
| EP | 0863681 A2 | 9/1998 |
| EP | 2224650 A1 | 1/2010 |

OTHER PUBLICATIONS

"Related U.S. Appl. No. 13/770,103", "NonFinal Office Action", Nov. 5, 2013, Publisher: USPTO, Published in: US.

(Continued)

*Primary Examiner* — Quoc D Tran
(74) *Attorney, Agent, or Firm* — Kaplan Breyer Schwarz & Ottesen LLP

(57) ABSTRACT

A system and method blend particular quality considerations into the process of expanding the route choices in a route table, such that more calls can be successfully routed while maximizing certain objectives. The quality considerations drive how additional routes are chosen for the route table and how call volumes are allocated to the chosen routes so that overall profitability can be maximized within the governing constraints of quality targets, route quality, predicted traffic, and route capacity.

20 Claims, 16 Drawing Sheets

(51) Int. Cl.
*H04M 3/36* (2006.01)
*H04M 7/12* (2006.01)
*H04Q 3/66* (2006.01)

(56) References Cited

U.S. PATENT DOCUMENTS

| | | | |
|---|---|---|---|
| 8,355,485 B2 | 1/2013 | Schultz | |
| 8,463,939 B1 | 6/2013 | Galvin | |
| 8,787,541 B1 * | 7/2014 | Saini | H04M 7/128 379/112.1 |
| 9,077,797 B2 * | 7/2015 | Saini | H04M 7/128 |
| 2003/0012356 A1 | 1/2003 | Zino et al. | |
| 2006/0133282 A1 | 6/2006 | Ramasamy | |
| 2007/0195700 A1 | 8/2007 | Katoh et al. | |
| 2008/0198998 A1 | 8/2008 | Aleynikov | |
| 2010/0149984 A1 | 6/2010 | Kapoor et al. | |

OTHER PUBLICATIONS

"Related U.S. Appl. No. 13/770,103", "Notice of Allowance", Mar. 6, 2014, Publisher: USPTO, Published in: US.

"U.S. Appl. No. 14/319,020 NonFinal Office Action", Sep. 10, 2014, Publisher: USPTO, Published in: US.

Officer: Ken Weider, "International Patent Application No. PCT/US14/16805", "International Search Report and Written Opinion", Mar. 21, 2014, Publisher: PCT, Published in: US.

Authorized Officer: Ken Weider, "International Preliminary Report on Patentability of the ISA", issued in International Patent Application No. PCT/US14/16805 on Sep. 3, 2015.

European Patent Application No. 14753506.6 "European Search Report", Feb. 8, 2016, Publisher: EPO, Published in: EP.

* cited by examiner

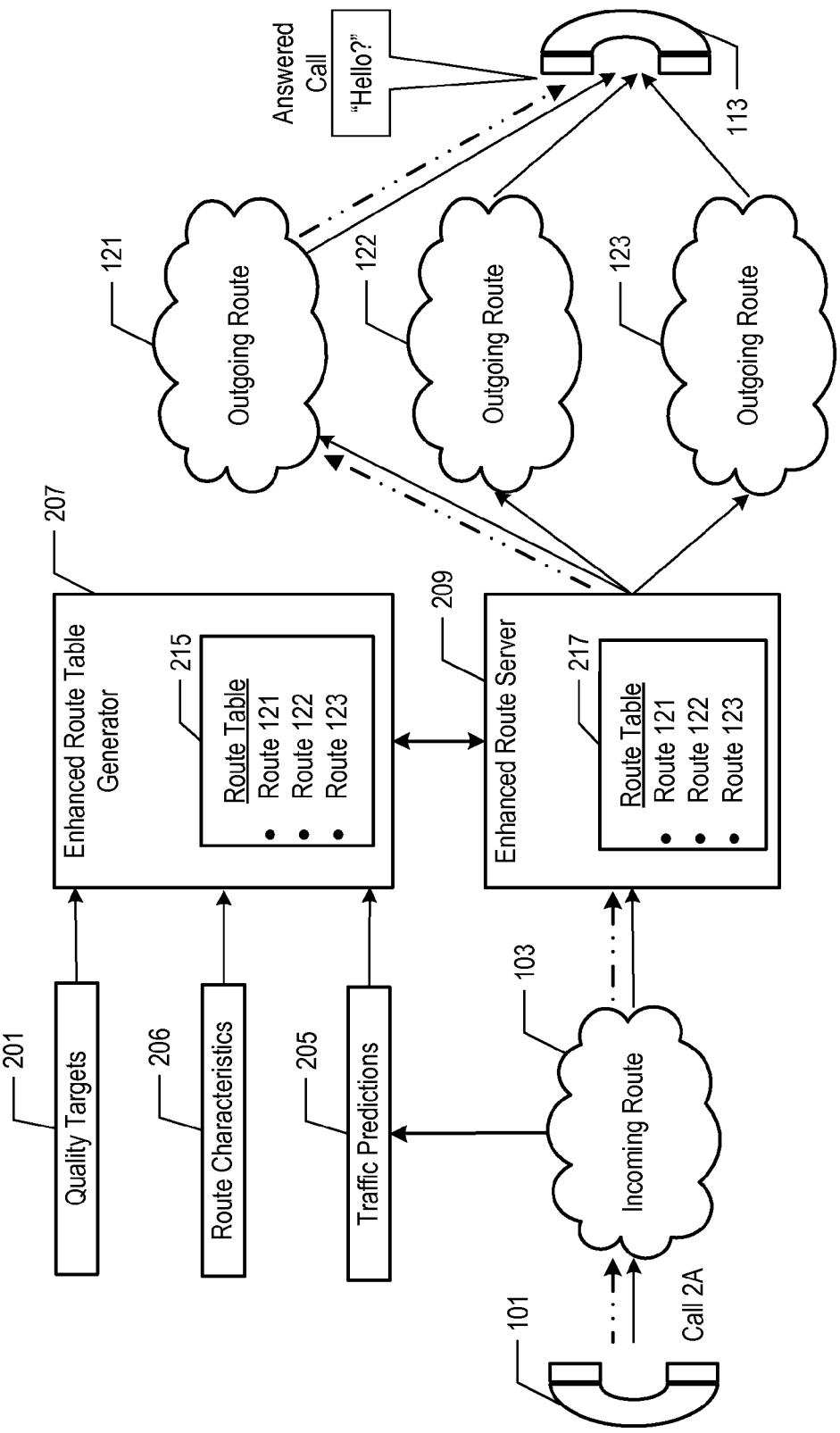

400

SYSTEM AND METHOD FOR QUALITY AUTO-BLENDING IN CALL ROUTING

CROSS-REFERENCE TO RELATED APPLICATION(S)

Application Ser. No. 13/770,103, filed Feb. 19, 2013, is incorporated herein by reference.

FIELD OF THE INVENTION

The present invention relates to telecommunications in general, and, more particularly, to call routing analysis.

BACKGROUND OF THE INVENTION

FIG. 1A depicts a schematic diagram of a portion of telecommunications system 100 that is typical in the prior art. Telecommunications system 100 comprises: a source of traffic predictions 105, a source of route characteristics (or corresponding supplier facility characteristics) 106, route table generator 107, and route server 109. FIG. 1A additionally depicts: call origin 101, incoming route 103, outgoing routes 121, 122, and 123, and call destination 113, which are connected to telecommunications system 100 as shown, but which are not components of telecommunications system 100.

Call origin 101, which well known in the art, represents a point where a call is initiated such as a telephone, a mobile station, a computer, etc., without limitation.

Incoming route 103, which is well known in the art, comprises one or more telecommunications facilities that collectively are capable of carrying a call (whether a voice call, a text message, or a data session) from call origin 101 to route server 109, e.g., trunks, switches, networks, sub-networks, the U.S. public switched telephone network, a national telecommunications network, the Internet, etc. Incoming route 103 can be circuit-switched, packet-switched, or a combination thereof, without limitation.

Traffic predictions 105, which are well known in the art, are stored in one or more data structures, and comprise predicted telecommunications traffic data for one or more periods of time, for one or more destinations. For example and without limitation, traffic predictions 105 comprise, per destination in a given period of time, the number of predicted calls. Traffic predictions 105 may be stored in a component of route table generator 107 or in a stand-alone component, or may be supplied by an outside system, or a combination thereof, etc., without limitation.

Route characteristics 106, which are well known in the art, are stored in one or more data structures, and comprise information about any facilities and outgoing routes emanating from route server 109. For example and without limitation, route characteristics 106 comprise the capacity of each available outgoing route and/or outgoing facility emanating from route server 109 typically measured in calling minutes available per hour; historical information about the routes/facilities, such as maintenance periods when a facility or route might be completely unavailable; and other historical performance data such as failure rates that measure the reliability of the route/facility. Route characteristics 106 may be stored in a component of route table generator 107 or in a stand-alone component, or may be supplied by an outside system, or a combination thereof, etc., without limitation.

Route table generator 107, which is well known in the art, is based on a processor or data-processing system or other computing platform. Route table generator 107 receives route characteristics 106 and traffic predictions 105 and, based on these and other data, generates one or more route tables for the use of route server 109. Route table generator 107 is discussed in further detail in subsequent figures.

Route server 109, which is well known in the art, is based on a processor, data-processing system, computing platform, call-processing system, or call-switching platform. Route server 109 may be co-resident with route table generator 107 or may be a separate component from route table generator 107. Route server 109 receives calls via one or more incoming routes such as incoming route 103 and, based on the contents of the route table generated by route-table generator 107, selects a proper outgoing facility and/or outgoing route for each call. Route server 109 is discussed in further detail in subsequent figures. According to the present figure, route server 109 is connected to three possible outgoing routes—routes 121, 122, and 123—all of which lead to the same destination 113.

Routes 121, 122, and 123, which are well known in the art, each comprises one or more telecommunications facilities capable of carrying a call (whether a voice call, a text message, or a data session) from route server 109 to call destination 113 or to an intermediate destination, e.g., trunks, switches, networks, sub-networks, the U.S. public switched telephone network, a national telecommunications network, the Internet, etc. Outgoing routes 121, 122, and 123 each can be circuit-switched, packet-switched, or a combination thereof, without limitation.

Call destination 113, which is well known in the art, represents a termination point where a call can be answered, such as a telephone, a mobile station, a computer, a switch, an answering machine, an incoming voice-response system, etc., without limitation. A destination 113 can be represented by any suitable addressing scheme such as a dialed number, a "Dialed Number Identification Service" ("DNIS"), a "Uniform Resource Locator" ("URL"), or a data endpoint address, a country code, or a city code, or an area code, or a combination thereof, etc., without limitation. Destination identification is well known in the art.

FIG. 1B depicts a more detailed schematic diagram of a portion of prior-art telecommunications system 100 depicted in FIG. 1A, including call 1B being routed to and answered at destination 113. In addition to the components and elements described in FIG. 1A, FIG. 1B additionally depicts: route table 115 in route table generator 107, route table 117 in route server 109, call 1B originating at call origin 101, a call attempt at the ingress to route server 109, a call seizure at the egress from route server 109 via outgoing route 123, and an answered call at destination 113.

As shown here, route table generator 107 generates table 115, which comprises only route 123 for destination 113 for the applicable time period. Route table generator 107 transmits route table 115 to route server 109. Route server 109 receives route table 115 and establishes it as the operative route table 117 to be used during the applicable time period.

As shown here, call 1B comes into route server 109 as a call attempt. Route server 109 receives call 1B and applies route table 117, which is the operative route table to be used during the present time period. According to route table 117, route 123 is the only allowed route to be used during the present time period. Accordingly, route server 109 places call 1B onto the telecommunications facilities corresponding to route 123, sending call 1B onwards towards destination 113—this operation represents a call seizure.

As shown here, call 1B successfully reaches destination 113, where the call is answered. Accordingly, call 1B is an answered call.

As shown here, outgoing route 123 is, among routes 121, 122, and 123, the one with the maximum profitability margin, and hence the reason it is the sole route in route table 115/117. This is because, according to the prior art, route table generator 107 generates route tables based on using maximum-margin routes; lower margin routes, which are less profitable, are not chosen for route table 115. This scheme is advantageous to the operator of route server 109, because it favors only the most profitable routes. However, as will become clear in FIG. 1C below, this scheme also presents several disadvantages, because it can cause substantial call blocking when the maximum-margin route lacks sufficient capacity to carry all incoming call attempts.

FIG. 1C depicts a more detailed schematic diagram of a portion of telecommunications system 100 depicted in FIG. 1A, including call 1C being blocked and not reaching destination 113. In addition to the components and elements described in FIG. 1A and FIG. 1B, FIG. 1C additionally depicts: call 1C originating at call origin 101, a call attempt at the ingress to route server 109, route 123 lacking capacity to carry call 1C, and consequently, call 1C being blocked at the egress from route server 109.

As shown earlier, table 115/117 comprises only route 123 for destination 113.

As shown here, call 1C comes into route server 109 as a call attempt. Route server 109 receives call 1C and applies operative route table 117; route 123 is the only allowed route to be used during the present time period according to route table 117. However, the facilities of route 123 are not available to carry call 1C (e.g., because the facilities are all busy with other calls or are down for maintenance, etc.). Route server 109 is constrained in only having route 123 populated in route table 117, and when route 123 is not available, route server 109 blocks outgoing call 1C. No call seizure occurs. The caller who originated call 1C must try again.

As explained, blocked calls are a substantial disadvantage in this scheme. First, they result in caller dissatisfaction. Second, they cost the route server operator profits when calls go uncompleted or unexpectedly drop. Moreover, margin-maximizing schemes like the one described above fail to consider other routes that have lower profit margins but are still cost-competitive.

SUMMARY OF THE INVENTION

The present inventors devised certain quality considerations that are blended into generating a route table to overcome some of the disadvantages of the prior art. Because call blocking is disadvantageous, expanding the number of route choices would be desirable, but risks damaging the operator's profitability when the added routes are not cost-effective. On the other hand, lowest-cost routes sometimes are plagued by quality problems such as poor voice quality, unavailability, unreliability, dropped calls, etc. Thus, merely adding more lowest-cost routes will not address the problems that arise in the prior art. The present inventors devised a system and method for blending particular quality considerations into the process of expanding the route choices in a route table, such that more calls can be successfully routed while retaining the operator's objective of maximizing profitability. The disclosed quality auto-blending techniques evaluate candidate outgoing routes based on specific quality metrics to determine (i) whether a new route should be chosen for a route table and (ii) how call volumes are to be allocated among the chosen routes, so that overall profitability can be maximized within the governing constraints of quality targets, route quality, predicted traffic, and route capacity. It will be understood by those having ordinary skill in the art, after reading the present disclosure, that any reference herein to a route also includes any devices or facilities that carry traffic into and out of the disclosed route server.

An illustrative telecommunications system comprises an enhanced route table generator and an enhanced route server. The route table generator generates a route table that is to direct the route server how to route calls during a given period of time, e.g., during the upcoming hour. The route table generator transmits the route table to the route server. During the given time period, the route server routes incoming call attempts based on the route choices and call allocations specified in the route table.

The route table generator iteratively generates and adapts a route table until no further optimization can be found. In this iterative process, the route table generator maximizes a profitability objective while expanding the pool of suitable routes in the route table based in part on quality targets. Some routes in the route table are allocated larger call volumes while other routes are allocated lower call volumes based in part on the quality metrics that are defined herein:

an "answer-seizure ratio" ("ASR") quality metric that is based on a ratio of answered calls to call seizures, and an "answered-call duration" ("ACD") quality metric that measures call duration per answered call for the given time period.

The answer-seizure ratio ASR represents a measure of quality of a route, because a call that is routed via an inadequate route may never reach its final destination and therefore cannot be answered at the destination. Thus a low ratio of answered calls to seized calls tends to indicate that the route has connection problems. The answered-call duration ACD represents a measure of quality of a route, because a call that is answered but has very poor voice quality, e.g., is unintelligible, has noise, has break-ups, etc., will not last long, because the parties on the call will get frustrated and hang up. Also, poor quality routes that drop calls also will have a short ACD. Thus, a short answered-call duration as compared to a baseline figure tends to indicate that the route has transmission problems.

The enhanced route table generator illustratively executes a linear programming run that generates an initial route table that maximizes a profitability metric for the predicted traffic for the given time period based at least in part on (i) a first threshold value of the ASR quality metric for the predicted traffic, wherein the ASR quality metric is based on a ratio of answered calls to call seizures, and (ii) the predicted traffic for the given time period. The resulting initial route table maximizes the objective subject to the established constraints and comprises at least one route chosen from the candidate routes such that at least some of the predicted traffic is allocated to the chosen route(s).

When the initial route table is evaluated against several criteria, including a target threshold value for the ACD quality metric, and is deemed not optimal by the route table generator, one or more linear programming runs are executed iteratively until an adapted route table is generated that is deemed optimal. In the course of the iterative route table generation, the ASR and ACD target thresholds are successively relaxed. Each route table generated in a subsequent linear programming run maximizes a profitability metric for the predicted traffic for the given time period based at least in part on (i) a relaxed threshold value of the ASR quality metric for the predicted traffic, wherein the ASR quality metric is based on a ratio of answered calls to call seizures, (ii) the predicted traffic for the given time period, and (iii) a relaxed threshold value of the ACD quality metric for the predicted traffic, wherein the ACD quality metric measures call duration per answered call for the given time period. In this way, the quality considerations are auto-blended into the route generation process, and they affect which routes are chosen and how big of a traffic allocation they are given so that profitability can be maximized to the extent possible. As a result, when calls are routed according to the optimized route table (whether it is the initial route table or a later adapted route table based on the initial route table), the resultant call routing is based on (A) the ASR quality metric and (B) the ACD quality metric.

An illustrative method comprises:
generating, by a telecommunications system, a route table for a predicted traffic, wherein the generating is based at least in part on:
(i) a first threshold value of a first quality metric for the predicted traffic, wherein the first quality metric is based on a ratio of answered calls to call seizures, and
(ii) the predicted traffic;
wherein at least some of the predicted traffic is allocated in the route table to one or more routes chosen from a plurality of routes that are candidates for carrying the predicted traffic; and
routing, by the telecommunications system, a plurality of calls according to the route table.

An illustrative system comprises:
a route table generator that is configured to generate a route table for a predicted traffic based at least in part on:
(i) a first threshold value of a first quality metric for the predicted traffic, wherein the first quality metric is based on a ratio of answered calls to call seizures, and
(ii) the predicted traffic; and
wherein at least some of the predicted traffic is allocated in the route table to one or more routes chosen from a plurality of routes that are candidates for carrying the predicted traffic; and
a route server that is configured to route a plurality of calls according to the route table.

Another illustrative method comprises:
receiving, by a route-table generator, a predicted traffic;
generating, by the route-table generator, a first route table for the predicted traffic, wherein the generating is based at least in part on:
(i) a first threshold value of the first quality metric for the predicted traffic, wherein the first quality metric is based on a ratio of answered calls to call seizures, and
(ii) a capacity characteristic for each of a plurality of routes that are candidates for carrying the predicted traffic, and
(iii) the predicted traffic; and
wherein at least some of the predicted traffic is allocated in the route table to one or more routes chosen from the plurality of candidate routes.

BRIEF DESCRIPTION OF THE DRAWINGS

FIG. 2A depicts a schematic diagram of some salient elements of telecommunications system 200 according to an illustrative embodiment of the present invention, and illustrating call 2A routed via route 121 and answered at destination 113.

DETAILED DESCRIPTION

Figure 1A:
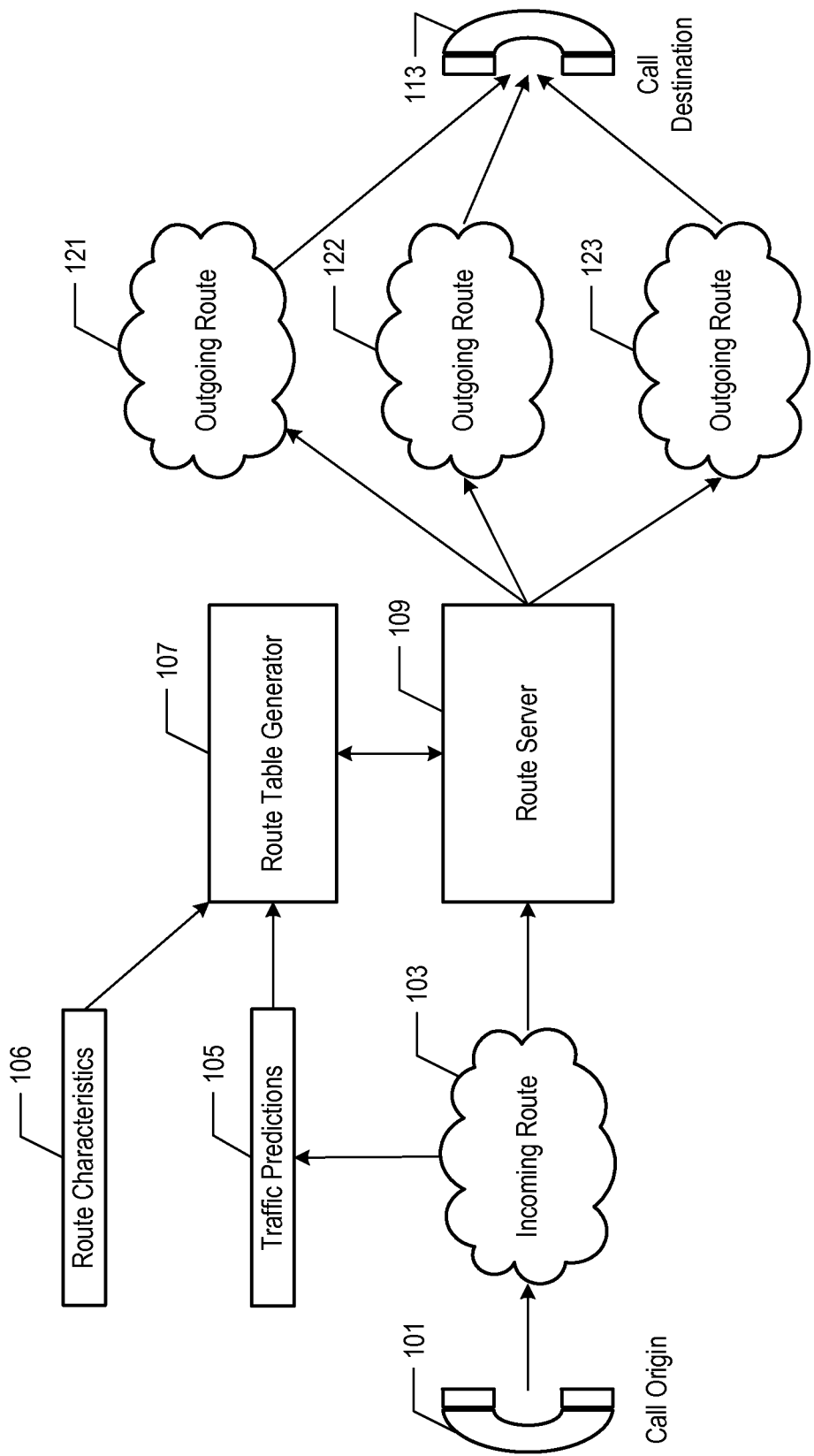
FIG. 1A depicts a schematic diagram of a portion of telecommunications system 100 that is typical in the prior art.
Figure 1B:
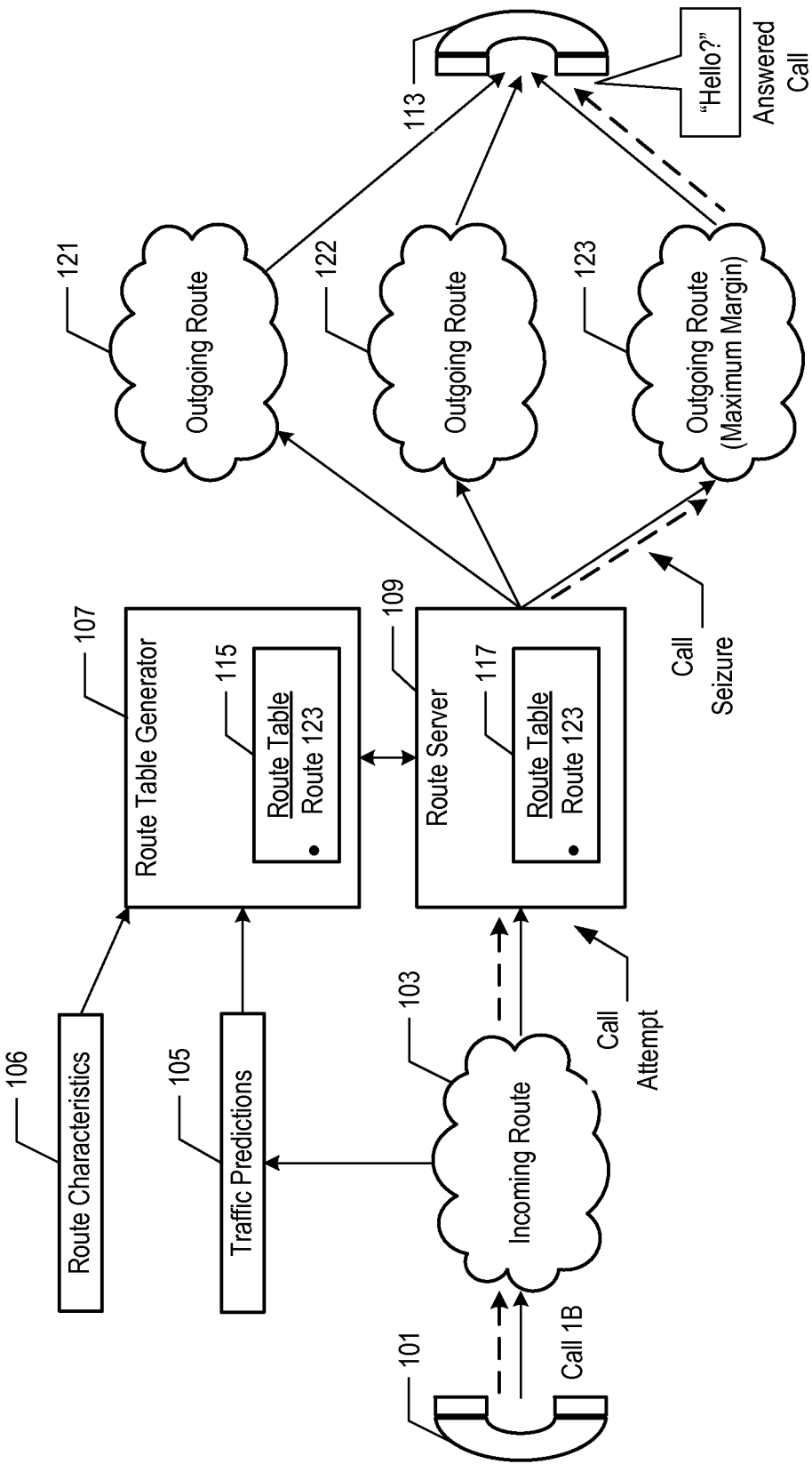
FIG. 1B depicts a more detailed schematic diagram of a portion of telecommunications system 100 depicted in FIG. 1A, including call 1B being routed to and answered at destination 113.

For the purposes of this specification, the following terms and their inflected forms are defined as follows:

1. A "call attempt" is defined as a call that arrives at a route server and which is to be processed by the route server. See, e.g., FIG. 1B. Successful call attempts are routed to an outgoing route via an outgoing facility available at the route server; in contrast, failed call attempts are blocked at the route server.

2. A "call seizure" is defined as a successful processing of a call by a route server that seizes an outgoing facility and places the call onto the outgoing facility, which carries the call via an outgoing route; examples of outgoing facilities that can be seized include without limitation a telecommunications trunk, a network, a sub-network, or some other supplier facility, or a combination thereof, that is capable of carrying the call onwards from the route server to another destination, e.g., to the call's final destination, or to an intermediate destination where the call is routed further. See, e.g., FIG. 1B.

3. An "answered call" is defined as a call that has reached its final destination and that is answered, whether by a human or a machine, at the destination. See e.g., FIG. 1B. Once answered, an answered call has a duration typically measured in minutes.

Figure 1C:
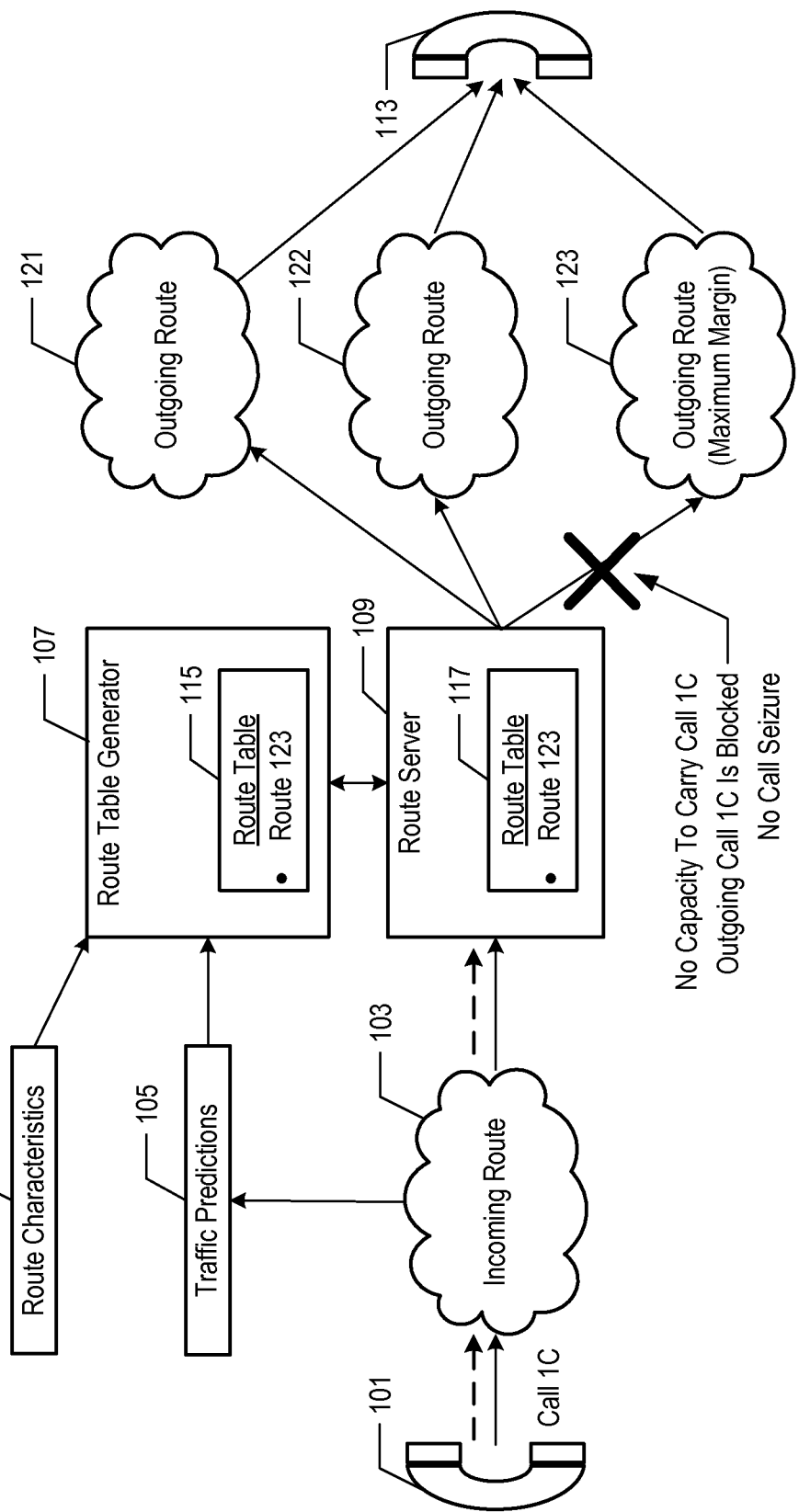
FIG. 1C depicts a more detailed schematic diagram of a portion of telecommunications system 100 depicted in FIG. 1A, including call 1C being blocked and not reaching destination 113.

4. A "blocked call" is defined a call attempt that is blocked at the route server when the route server does not seize any outgoing facility. Reasons for blocking the call include without limitation a lack of available facilities (e.g., all busy, down for maintenance, etc.), a lack of suitable facilities (e.g., no profit-bearing routes), a blockage enforced by a routing table in the route server, a failure in the route server, etc. See, e.g., FIG. 1C.

5. A "answer-seizure ratio" ("ASR") is defined, according to the illustrative embodiment of the present invention, as a quality metric that is based on a ratio of answered calls to call seizures over a period of time.

6. A "answered-call duration" ("ACD") is defined, according to the illustrative embodiment of the present invention, as a quality metric that measures call duration per answered call over a period of time.

Other terms may be defined elsewhere in the present disclosure.

FIG. 2A depicts a schematic diagram of some salient elements of telecommunications system 200 (with quality blending) according to an illustrative embodiment of the present invention, and depicts call 2A routed via route 121 and answered at destination 113. Telecommunications system 200 comprises: quality targets 201, traffic predictions 205, route characteristics 206, enhanced route table generator 207 (comprising route table 215), and enhanced route server 209 (comprising route table 217). FIG. 2A additionally depicts: call origin 101, incoming route 103, outgoing routes 121, 122, and 123, and call destination 113, which are connected to telecommunications system 200 as shown, but which are not components of telecommunications system 200 and which were described above and will not be repeated here for the sake of brevity.

FIG. 2A further depicts: call 2A originating at call origin 101, a call attempt at the ingress to enhanced route server 209, a call seizure at the egress from enhanced route server 209 via outgoing route 121, and an answered call at destination 113. FIG. 2A also indicates that according to at least one relevant quality metric in respect to outgoing routes 121, 122, and 123, the quality of route 121 exceeds the quality of route 122 which exceeds the quality of route 123. Notably, these quality metrics were not considered in the prior-art schemes described in reference to FIGS. 1A, 1B, and 1C. In contrast, the illustrative embodiment of the present invention takes into consideration one or more route-quality metrics when enhanced route table generator 207 generates route table 215—the illustrative techniques are referred to herein as "quality blending" (or "quality auto-blending") and involve the ASR and ACD quality metrics. The quality metrics and quality blending techniques are described in more detail below and in the accompanying figures.

Quality targets 201 are stored in one or more data structures and comprise performance targets to be applied in generating route table 215. According to the illustrative embodiment, quality targets 201 comprise (i) a first threshold for the answer-seizure ratio quality metric ("ASR"), and (ii) a second threshold for the answered-call duration quality metric ("ACD"). The quality targets 201 reflect aspirational levels of call-routing performance for a given time interval and will be discussed in more detail below and in the accompanying figures. According to the illustrative embodiment, quality targets 201 are stored in a data structure of a component external to enhanced route table generator 207; however, it will be clear to those having ordinary skill in the art, after reading the present disclosure, how to make and use alternative embodiments wherein quality targets 201 are stored within enhanced route table generator 207, etc., without limitation.

Traffic predictions 205, which are well known in the art, are stored in one or more data structures and comprise predicted telecommunications traffic data for one or more periods of time, for one or more destinations. For example and without limitation, traffic predictions 205 comprise, per destination in a given period of time, the number of predicted calls and the expected per-call duration. Notably, a feedback path (not shown) from enhanced route server 209 provides historical call duration information for traffic predictions 205. According to the illustrative embodiment, traffic predictions 205 are generated and stored in a data structure of a component external to enhanced route table generator 207; however, it will be clear to those having ordinary skill in the art, after reading the present disclosure, how to make and use alternative embodiments wherein traffic predictions 205 are stored within enhanced route table generator 207, etc., without limitation.

Route characteristics 206, which are well known in the art, are stored in one or more data structures, and comprise information about any facilities and outgoing routes emanating from enhanced route server 209, e.g., routes 121, 122, and 123. For example and without limitation, route characteristics 206 comprise: the capacity of each outgoing route and/or outgoing facility emanating from enhanced route server 209 typically measured in calling minutes available per hour; historical information about the routes/facilities, such as maintenance periods when a facility or route might be completely unavailable; and other historical performance data such as failure rates that measure the reliability of the route/facility. Notably, a feedback path (not shown) from enhanced route server 209 provides historical information to route characteristics 206. According to the illustrative embodiment, route characteristics 206 are generated and stored in a data structure of a component external to enhanced route table generator 207; however, it will be clear to those having ordinary skill in the art, after reading the present disclosure, how to make and use alternative embodiments wherein route characteristics 206 are stored within enhanced route table generator 207, etc., without limitation.

Enhanced route table generator 207 (or "table generator 207"), coordinates and executes the operations of method 400 herein, and is described in further detail below and in the accompanying figures.

Enhanced route server 209 (or "route server 209"), coordinates and executes the operations of method 1100 herein, and is described in more detail below and in the accompanying figures. Notably, route server 209 is responsible for handling a call, i.e., processing a call arriving from an incoming route and placing it on an available outgoing route or corresponding facility (if any), but route server 209 is not responsible for handling the call after egress from the route server.

Route table 215/217 comprises routes 121, 122, and 123 for destination 113; however, it will be clear to those having ordinary skill in the art, after reading the present disclosure, how to make and use alternative embodiments wherein the route table comprises any number of outgoing routes according to the disclosed methods herein.

According to the illustrative embodiment, enhanced route table generator 207 and enhanced route server 209 are distinct components of telecommunications system 200. However, it will be clear to those having ordinary skill in the art, after reading the present disclosure, how to make and use alternative embodiments of the present invention, wherein enhanced route table generator 207 and enhanced route server 209 are co-resident on the same hardware platform, or form a single integrated component, or are otherwise combined. It will be further clear to those having ordinary skill in the art, after reading the present disclosure, how to make alternative embodiments wherein elements 201, 206, 205, 207, and 209 are embodied in a single multi-functional integral component, or are differently combined or sub-divided than shown herein. Although the present figure depicts only one call origin 101, one incoming call 2A, and one incoming route 103, it will be clear to those having ordinary skill in the art, after reading the present disclosure, how to make alternative embodiments of telecommunications system 200 with any number of call origins, any number of incoming call attempts, and any number of incoming routes. Likewise, although the present figure depicts only three outgoing routes and only one destination 113, it will be clear to those having ordinary skill in the art, after reading the present disclosure, how to make alternative embodiments of telecommunications system 200 with any number of outgoing routes and any number of destinations. Further, it will be clear to those having ordinary skill in the art, after reading the present disclosure, how to make alternative embodiments wherein the relative quality of the outgoing routes is different than depicted here.

Figure 2B:
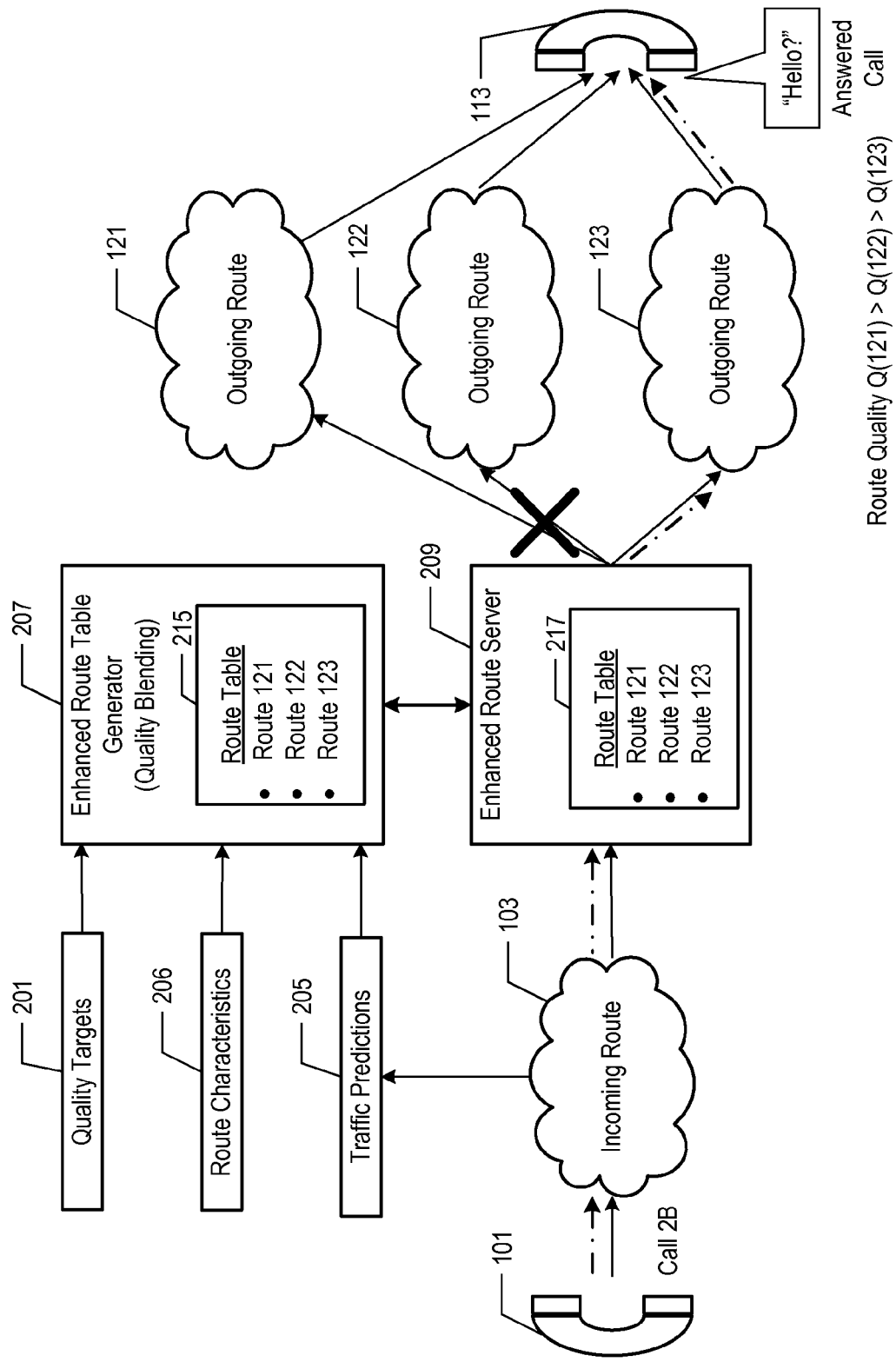
FIG. 2B depicts a schematic diagram of some salient elements of telecommunications system 200 according to the illustrative embodiment of the present invention, and illustrating call 2A routed via route 123 and answered at destination 113.

FIG. 2B depicts a schematic diagram of some salient elements of telecommunications system 200 (with quality blending) according to the illustrative embodiment of the present invention, and illustrating call 2A routed via route 123 and answered at destination 113. FIG. 2B depicts the same elements depicted in FIG. 2A, except that outgoing routes 121 and 122 are unavailable here (e.g., all busy, down for maintenance, etc.) and call 2B is routed by enhanced route server 209 to outgoing route 123. Notably, although illustratively the quality (according to the ASR and/or ACD quality metrics) of route 123 is lower than the respective quality of the unavailable routes 121 and 122, route table 217 includes route 123 and therefore call 2B is not blocked.

Figure 3A:
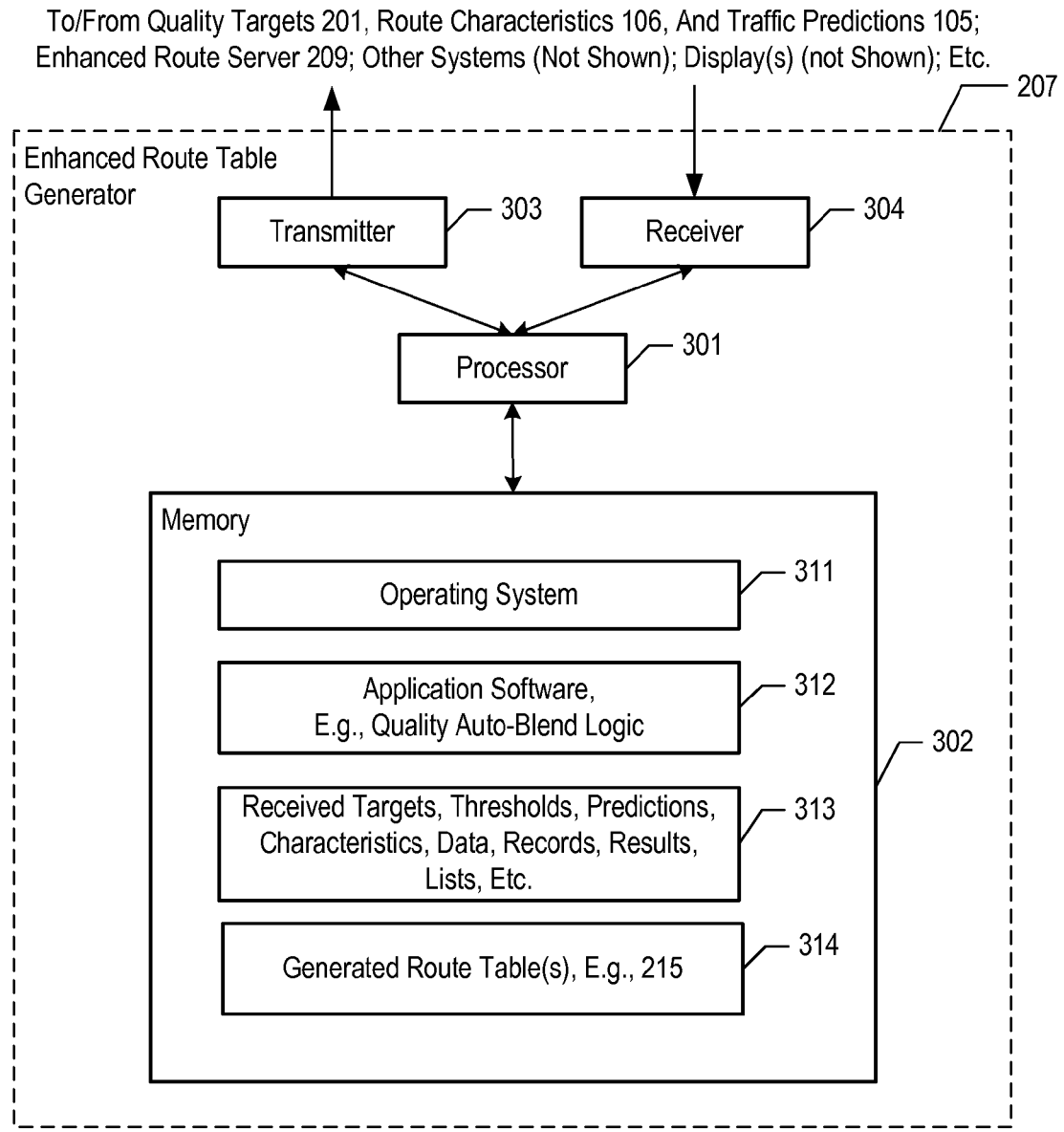
FIG. 3A depicts a schematic diagram of the hardware platform for enhanced route table generator 207 according to the illustrative embodiment.

FIG. 3A depicts a schematic diagram of the hardware platform for enhanced route table generator 207 according to the illustrative embodiment. According to the illustrative embodiment, enhanced route table generator 207 is based on a data-processing apparatus whose hardware platform comprises: processor 301, memory 302, transmitter 303 and receiver 304.

Processor 301 is a processing device such as a microprocessor that is well known in the art. Processor 301 is configured such that, when operating in conjunction with the other components of route table generator 207, processor 301 executes software, processes data, and telecommunicates according to the operations described herein.

Memory 302 is non transitory and non volatile computer storage memory technology that is well known in the art, e.g., flash, RAM, etc. Memory 302 stores operating system 311, application software 312, element 313, and element 314. The specialized application software 312 that is executed by processor 301 is illustratively denominated the "quality autoblend logic" that enables enhanced route table generator 207 to perform the operations of method 400. Memory element 313 illustratively comprises received quality targets (e.g., from quality targets 201), traffic predictions (e.g., from traffic predictions 205), route characteristics and historical performance data (e.g., from route characteristics 206). Memory element 313 also comprises other data, records, results, lists, associations, indicators, whether of an intermediate nature, final results, or archival. The generated routing table(s) (e.g., route table 215) that is to be transmitted to enhanced route server 209 is illustratively stored in memory element 314. It will be clear to those having ordinary skill in the art how to make and use alternative embodiments that comprise more than one memory 302; or comprise subdivided segments of memory 302; or comprise a plurality of memory technologies that collectively store operating system 311, application software 312, and elements 313 and 314.

Transmitter 303 is a component that enables route table generator 207 to telecommunicate with other components and systems by transmitting electromagnetic signals thereto. For example, transmitter 303 enables telecommunication pathways to quality targets 201, traffic predictions 205, route characteristics 206, enhanced route server 209, other systems (not shown), display(s) (not shown), etc. without limitation. Transmitter 303 is well known in the art. It will be clear to those having ordinary skill in the art how to make and use alternative embodiments that comprise more than one transmitter 303. Transmitter 303 is shown in a wired configuration, but in some alternative embodiments, transmitter 303 may telecommunicate wirelessly.

Receiver 304 is a component that enables route table generator 207 to telecommunicate with other components and systems by receiving electromagnetic signals therefrom. For example, receiver 304 enables telecommunication pathways from quality targets 201, traffic predictions 205, route characteristics 206, enhanced route server 209, other systems (not shown), display(s) (not shown), etc. without limitation. Receiver 304 is well known in the art. It will be clear to those having ordinary skill in the art how to make and use alternative embodiments that comprise more than one receiver 304. Receiver 304 is shown in a wired configuration, but in some alternative embodiments, receiver 304 may telecommunicate wirelessly.

It will be clear to those skilled in the art, after reading the present disclosure, that in some alternative embodiments the hardware platform of route table generator 207 can be embodied as a multi-processor platform, as a sub-component of a larger computing platform, as a virtual computing element, or in some other computing environment—all within the scope of the present invention. It will be clear to those skilled in the art, after reading the present disclosure, how to make and use the hardware platform for route table generator 207.

Figure 3B:
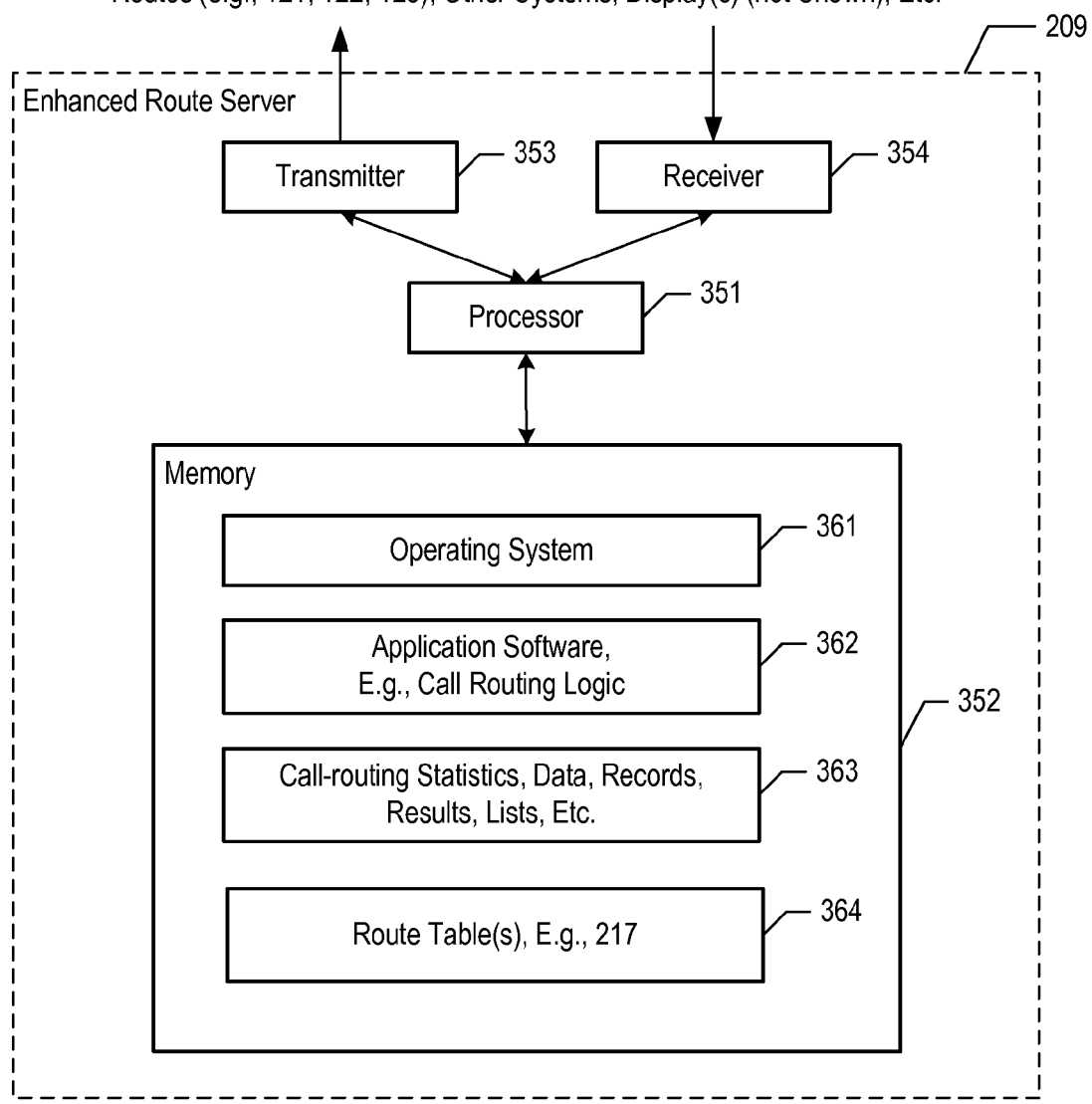
FIG. 3B depicts a schematic diagram of the hardware platform for enhanced route server 209 according to the illustrative embodiment.

FIG. 3B depicts a schematic diagram of the hardware platform for enhanced route server 209 according to the illustrative embodiment. According to the illustrative embodiment, enhanced route server 209 is a data-processing apparatus whose hardware platform comprises: processor 351, memory 352, transmitter 353 and receiver 354.

Processor 351 is a processing device such as a microprocessor that is well known in the art. Processor 351 is configured such that, when operating in conjunction with the other components of route server 209, processor 351 executes software, processes data (including the processing of calls), and telecommunicates according to the operations described herein.

Memory 352 is non transitory and non volatile computer storage memory technology that is well known in the art, e.g., flash, RAM, etc. Memory 352 stores operating system 361, application software 362, element 363, and element 364. The specialized application software 362 that is executed by processor 351 is illustratively denominated the "call routing logic" that enables route server 209 to perform the operations of method 1100. Memory element 363 illustratively comprises call routing statistics collected by route server 209, as well as other data, records, results, lists, associations, indicators, whether of an intermediate nature, final results, or archival. The operative routing table(s) (e.g., route table 217) that is the basis for routing calls is illustratively stored in memory element 364. It will be clear to those having ordinary skill in the art how to make and use alternative embodiments that comprise more than one memory 352; or comprise subdivided segments of memory 352; or comprise a plurality of memory technologies that collectively store operating system 361, application software 362, and elements 363 and 364.

Transmitter 353 is a component that enables route server 209 to telecommunicate with other components and systems by transmitting electromagnetic signals thereto. For example, transmitter 303 enables telecommunication pathways to enhanced route table generator 207, incoming routes (e.g., 103), outgoing routes (e.g., 121, 122, 123), other systems (not shown), display(s) (not shown), etc. without limitation. Transmitter 353 is well known in the art. It will be clear to those having ordinary skill in the art how to make and use alternative embodiments that comprise more than one transmitter 353. Transmitter 353 is shown in a wired configuration, but in some alternative embodiments, transmitter 353 may telecommunicate wirelessly.

Receiver 354 is a component that enables route server 209 to telecommunicate with other components and systems by receiving electromagnetic signals therefrom. For example, receiver 354 enables telecommunication pathways from enhanced route table generator 207, incoming routes (e.g., 103), outgoing routes (e.g., 121, 122, 123), other systems (not shown), display(s) (not shown), etc. without limitation. Receiver 354 is well known in the art. It will be clear to those having ordinary skill in the art how to make and use alternative embodiments that comprise more than one receiver 354. Receiver 354 is shown in a wired configuration, but in some alternative embodiments, receiver 354 may telecommunicate wirelessly.

It will be clear to those skilled in the art, after reading the present disclosure, that in some alternative embodiments the hardware platform of route server 209 can be embodied as a multi-processor platform, as a sub-component of a larger computing platform, as a virtual computing element, or in some other computing environment—all within the scope of the present invention. It will be clear to those skilled in the art, after reading the present disclosure, how to make and use the hardware platform for route server 209.

Figure 4:
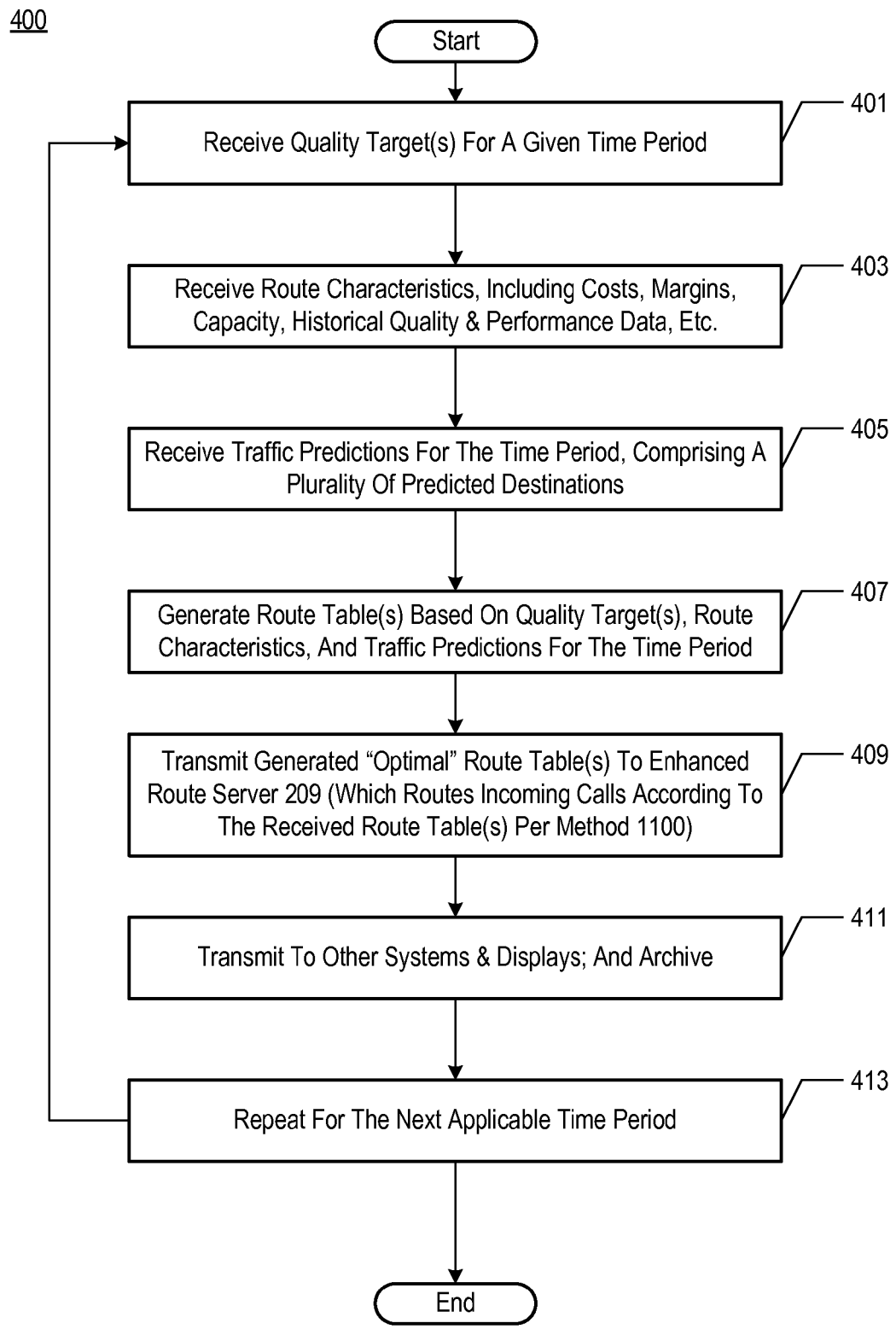
FIG. 4 depicts some salient operations of method 400 according to the illustrative embodiment.

FIG. 4 depicts some salient operations of method 400 according to the illustrative embodiment. Route table generator 207 is the entity within illustrative telecommunications system 200 that executes and coordinates the operations of method 400 according to the illustrative embodiment of the quality auto-blend logic.

At operation 401, route table generator 207 receives one or more quality targets for a given time period, e.g., for the upcoming hour. Operation 401 is described in more detail below and in the accompanying figures.

At operation 403, route table generator 207 receives route characteristics that include illustratively costs, margins, capacity, historical data, and performance data for each route that emanates from route server 209. Illustratively, route table generator 207 receives route characteristics 206. The routes that emanate from route server 209 that are potential candidates for routing a call to a given destination are designated herein as "candidate" routes. As described in more detail below, candidate routes are evaluated in subsequent operations and some are chosen for the route table.

At operation 405, route table generator 207 receives traffic predictions for the given time period. The traffic predictions illustratively comprise traffic corresponding to a plurality of destinations that are served by telecommunications system 200. Illustratively, route table generator 207 receives traffic predictions 205 for the given time period.

At operation 407, route table generator 207 generates one or more route tables based on the quality targets, the route characteristics, and traffic predictions received in the preceding operations. Operation 407 is described in more detail below and in the accompanying figures.

At operation 409, route table generator 207 transmits the generated route table(s) (designated "optimal") to route server 209. As described in regard to method 1100, route server 209 routes incoming calls according to the route table(s) received from route table generator 207.

At operation 411, route table generator 207 transmits information to other systems, and to any relevant displays, and archives as appropriate—according to transmission techniques that are well known in the art.

At operation 413, route table generator 207 passes control back to operation 401 to repeat the aforementioned operations for the next applicable time period, e.g., the hour that follows the present given time period. It will be clear to those having ordinary skill in the art, after reading the present disclosure, how to make and use alternative embodiments of the present invention wherein method 400 is not limited to an upcoming fixed time period, but is instead executed in real-time to identify an "optimal" route or route table that is to be immediately applied to a pending call, such that the repetitive loop illustrated by operation 413 is eliminated in whole or in part. The present invention is not limited to an hourly or periodic execution of method 400 in preparation for an upcoming time period; a more flexible approach could be implemented by those having ordinary skill in the art, after reading the present disclosure.

In regard to method 400, it will be clear to those having ordinary skill in the art, after reading the present disclosure, how to make and use alternative embodiments of method 400 wherein the recited operations and sub-operations are differently sequenced, grouped, or sub-divided—all within the scope of the present invention. It will be further clear to those skilled in the art, after reading the present disclosure, how to make and use alternative embodiments of method 400 wherein some of the recited operations and sub-operations are optional, are omitted, or are executed by other elements and/or systems, e.g., by route server 209 or by a unified element that both generates the route tables and routes call according thereto.

Figure 5:
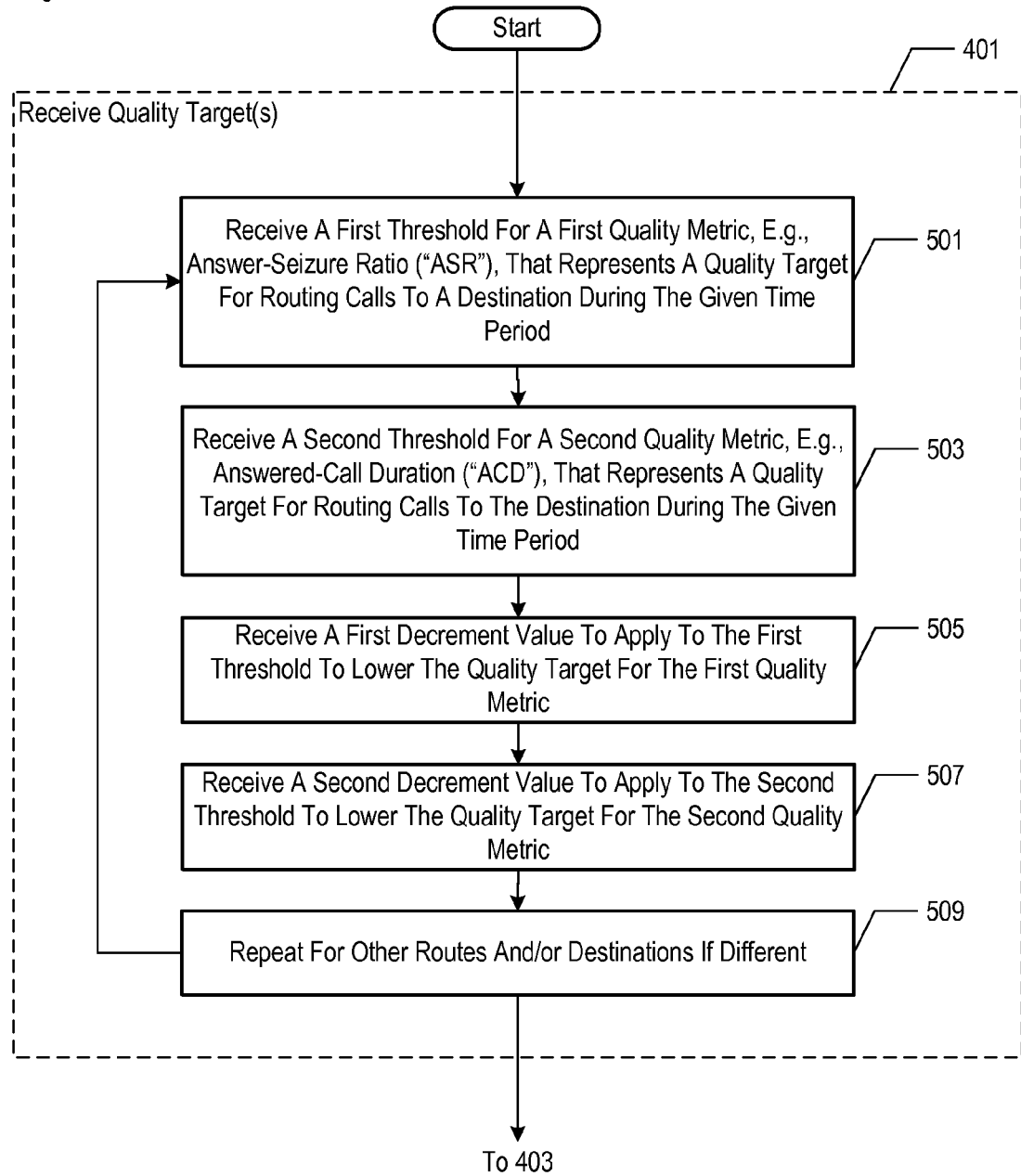
FIG. 5 depicts some salient sub-operations of operation 401 according to the illustrative embodiment.

FIG. 5 depicts some salient sub-operations of operation 401 according to the illustrative embodiment.

At operation 501, route table generator 207 receives a first threshold for a first quality metric, e.g., for the answer-seizure ratio ASR metric; the threshold represents a quality target for routing calls to a destination during the given time period. Illustratively, the target ASR threshold is 100%, meaning that the target is to have 100% of seized calls reach their destination and be answered.

At operation, 503, route table generator 207 receives a second threshold for a second quality metric, e.g., for the answered-call duration ACD metric; the threshold represents a quality target for routing calls to the destination during the given time period. Illustratively, the target ACD threshold is 10 minutes, meaning that the target is to have a 10-minute call duration per call routed during the given time period.

At operation 505, route table generator 207 receives a first decrement value to apply to the first threshold to lower (or relax) the quality target for the first quality metric. Illustratively, the first decrement is 10%, meaning that if it becomes necessary to relax the ASR target (as described in further detail below), the decrease will be in 10% decrements, i.e., from 100% ASR to 90% ASR to 81% ASR, etc.

At operation 507, route table generator 207 receives a second decrement value to apply to the second threshold to lower (or relax) the quality target for the second quality metric. Illustratively, the second threshold is also 10%, meaning that if it becomes necessary to relax the ACD target (as described in further detail below), the decrease will be in 10% decrements, i.e., from 10 minutes-per-call ACD to 9 minutes to 8.1 minutes, etc.

At operation 509, route table generator 207 passes control back to operation 501 to repeat the aforementioned operations for another destination having predicted traffic, or for other outgoing routes, as appropriate. When all destinations and outgoing routes associated with route server 209 have been considered, control passes to operation 403. It will be clear to those having ordinary skill in the art, after reading the present disclosure, how to make and build alternative embodiments having different target values, different thresholds, different decrements, and different relaxation schemes from those of the illustrative embodiment.

Figure 6:
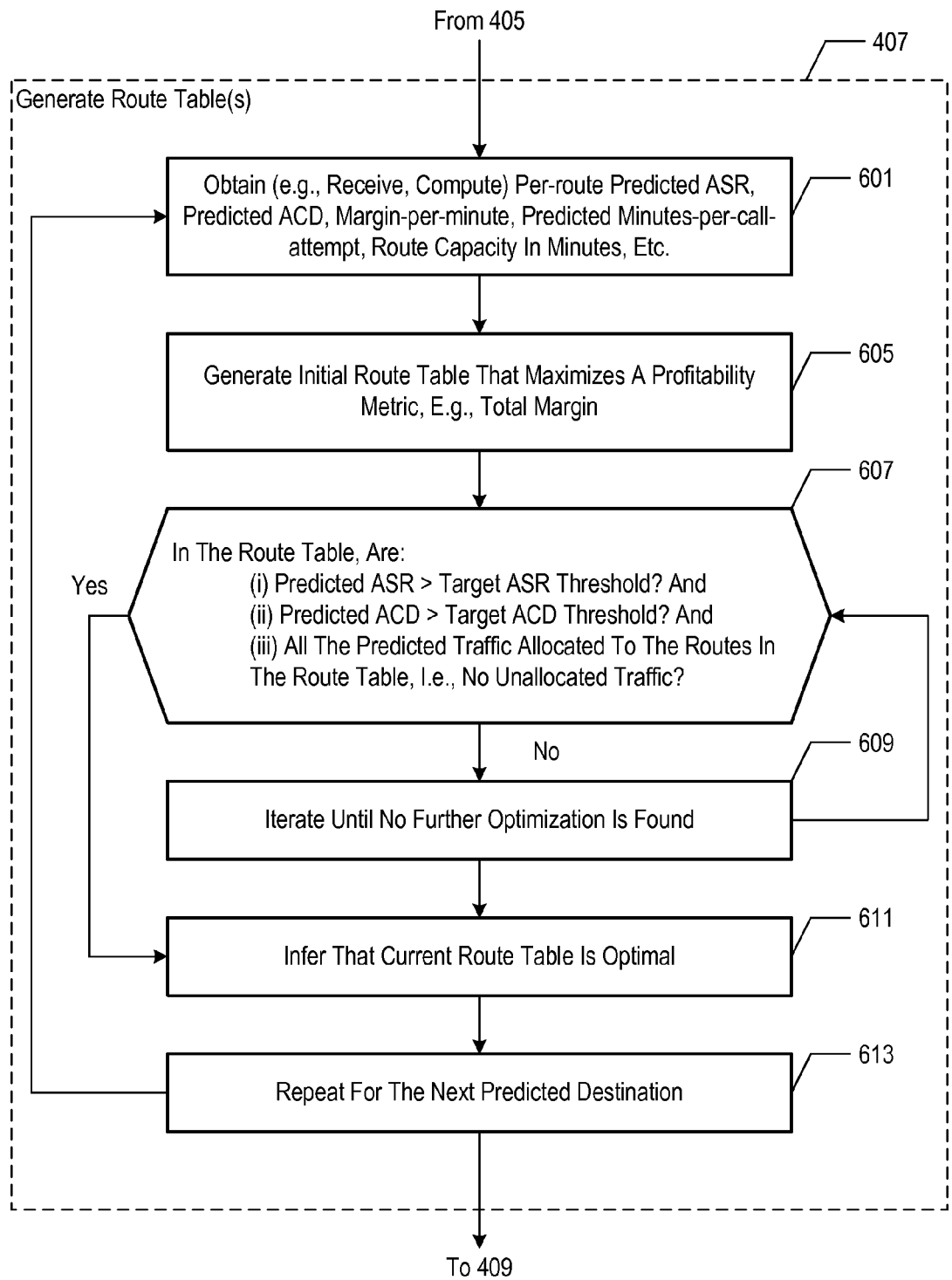
FIG. 6 depicts some salient sub-operations of operation 407 according to the illustrative embodiment.

FIG. 6 depicts some salient sub-operations of operation 407 according to the illustrative embodiment.

At operation 601, route table generator 207 obtains (for example, by receiving from another entity, or by computing locally) a predicted ASR value for each candidate route. Illustratively, route table generator 207 computes a predicted ASR value for each candidate route based on historical data and performance metrics from earlier time periods, e.g., a baseline same hour of the day on the same year-ago day of week as the given period of time. Thus, for the relevant baseline time period on a given candidate route, route table generator 207 computes the ratio of answered calls to seized calls. This value is used as the predicted ASR. It will be clear to those having ordinary skill in the art, after reading the present disclosure, how to make and use alternative embodiments based on one or more of the following baseline time periods: last-hour today, same-hour yesterday, same-hour in previous one or more weeks, special days such as Mother's Day, etc. without limitations. The choice of an appropriate baseline time period is left to the implementers practicing the present invention.

Further, route table generator 207 also obtains a predicted ACD value for each candidate route, a predicted minutes-per-call-attempt value for each candidate route, and a capacity value for each candidate route (illustratively in minutes available for the given period of time). Illustratively, route table generator 207 computes the predicted ACD for each candidate route based on historical data and performance metrics from earlier time periods, e.g., a baseline same hour of the day on the same year-ago day of week as the given period of time. It will be clear to those having ordinary skill in the art, after reading the present disclosure, how to make and use alternative embodiments based on one or more of the following baseline time periods: last-hour today, same-hour yesterday, same-hour in past weeks, special days such as Mother's Day, etc. without limitations. The choice of an appropriate baseline time period is left to the implementers practicing the present invention.

Further, route table generator 207 also obtains a predicted minutes-per-call-attempt value for each candidate route. Illustratively, route table generator 207 computes the predicted minutes-per-call-attempt value for each candidate route based on historical data, measuring the ratio of the number of minutes a call was connected on the route to the number of call attempts during the baseline time period. It will be clear to those having ordinary skill in the art, after reading the present disclosure, how to make and use alternative embodiments based on one or more of the following baseline historical time periods: last-hour today, same-hour yesterday, same-hour in past weeks, special days such as Mother's Day, etc. without limitations. The choice of an appropriate baseline time period is left to the implementers practicing the present invention.

Further, route table generator 207 also obtains a capacity value for each candidate route, illustratively in minutes available for the given period of time.

It will be clear to those having ordinary skill in the art, after reading the present disclosure, how to properly select the baseline figures and time periods to be used in computing the predicted metrics in the current operation. For example, for a given one-hour period of time, the baseline is illustratively the same hour of the day on the same year-ago day of week as the given period of time. However, other schemes could be devised, such as a daily hourly average from the previous day, or year-ago data that is modulated by a recent performance improvement in the facilities of a given route, etc. As noted earlier, it will be up to the implementers to choose one or more baseline time periods and supporting baseline data for obtaining the metrics specified in the present operation.

At operation 605, route table generator 207 generates an initial route table that maximizes a predefined profitability metric. Illustratively, the profitability metric to be optimized is a total margin value encompassing all the allocated calls during the given time period according to the route table. Illustratively, route table generator 207 uses linear programming to process several constraints and maximize the total margin. The present operation is described in more detail below and in the accompanying figures.

At operation 607, route table generator 207 analyzes whether, according to the generated route table:
 (i) the predicted ASR exceeds the target ASR for every route in the route table, and
 (ii) the predicted ACD exceeds the target ACD for every route in the route table, and
 (iii) all the predicted traffic for the time period is allocated to the routes in the route table, i.e., there is no unallocated traffic in the route table.

When the answer to all three of these analyses is affirmative, control passes to operation 611. When the answer to one or more of these analyses is negative, control passes to operation 609.

At operation 609, route table generator 207 iterates until no further route table optimization is found. When no further optimization is found, control passes to operation 611; otherwise, control passes back to operation 607. Operation 609 is described in further detail below and in the accompanying figures.

At operation 611, which is reached from operation 607 and from operation 609, route table generator 207 infers that the current extant route table is optimal and passes control to operation 613.

At operation 613, route table generator 207 repeats the cycle of operations for a next predicted destination for the given period of time; thus, for example, if the traffic predictions 205 predict traffic to ten distinct destinations for the given time period, operation 407 including its constituent sub-operations is executed for each of the ten distinct destinations. Then, control passes from operation 407 to operation 409. It will be clear to those having ordinary skill in the art, after reading the present disclosure, how to make and use alternative embodiments of the present invention wherein operation 407 is executed once for several or even all of the contemplated destinations of the predicted traffic, such that the repetitive loop illustrated by operation 613 is eliminated in whole or in part. This unified approach would tend to reduce the overall processing time of generating the route table.

Figure 7:
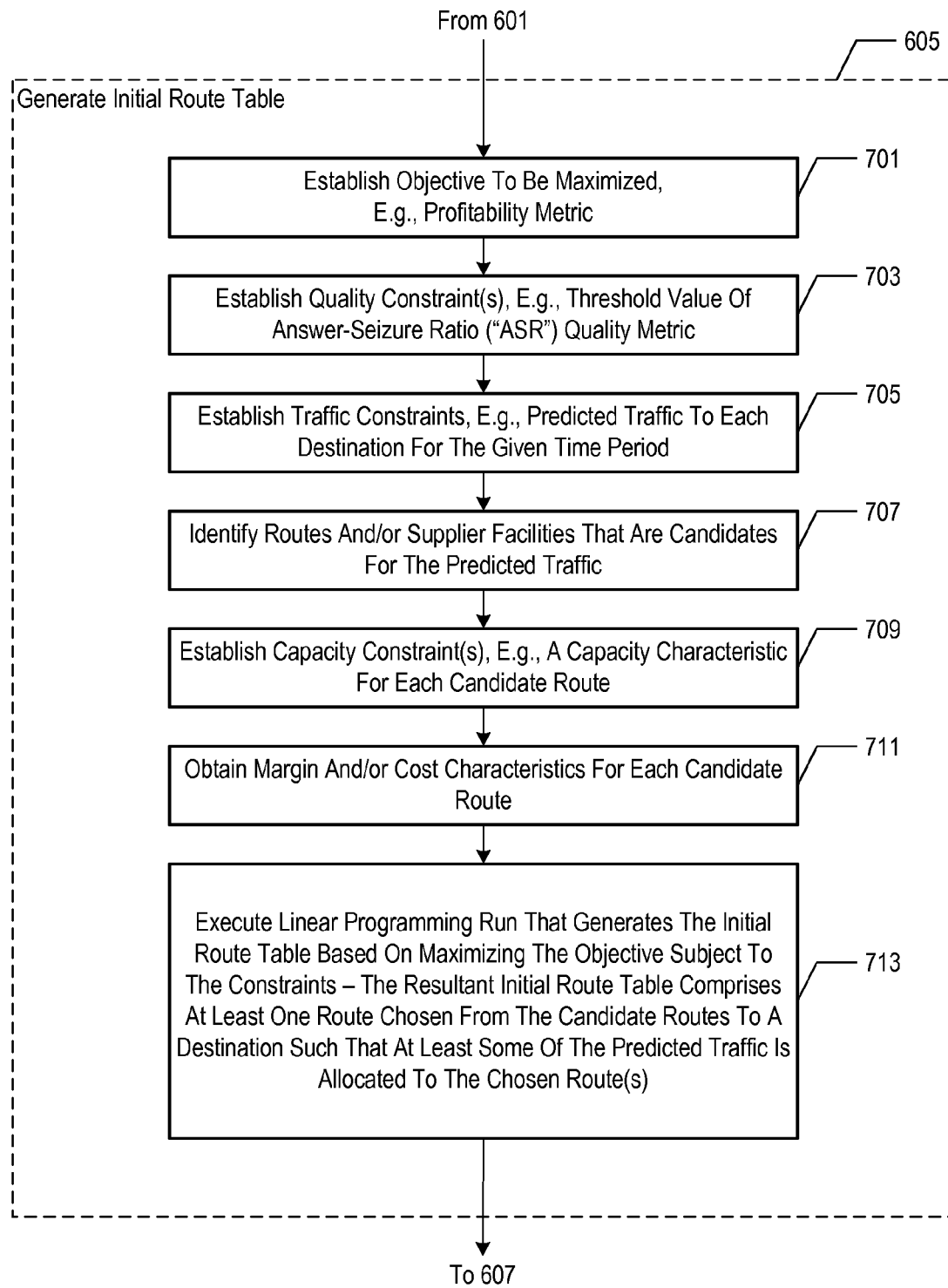
FIG. 7 depicts some salient sub-operations of operation 605 according to the illustrative embodiment.

FIG. 7 depicts some salient sub-operations of operation 605 according to the illustrative embodiment. Because the illustrative embodiment generates a route table based on linear programming techniques, the present operation accordingly establishes the objective(s) to be maximized and the relevant constraints (including the ASR quality metric and its supporting data) to apply to the execution of the linear programming run.

Although the illustrative embodiment generates an initial route table based on linear programming that uses the objective and constraints set forth below, it will be clear to those having ordinary skill in the art, after reading the present disclosure, how to make and use alternative embodiments wherein the objective and/or the constraints differ while still remaining within the scope of the present invention. Likewise, it will be further clear to those having ordinary skill in the art, after reading the present disclosure, how to make and use alternative embodiments that generate the route table without linear programming techniques such that the route table maximizes a profitability metric for the predicted traffic based at least in part on (i) the first threshold value of the ASR quality metric for the predicted traffic, wherein the ASR quality metric is based on a ratio of answered calls to call seizures, and (ii) the predicted traffic—while still remaining within the scope of the present invention. For example, in some alternative embodiments, the initial route table maximizes a profitability metric for the predicted traffic based at least in part on (i) the first threshold value of the ASR quality metric for the predicted traffic, wherein the ASR quality metric is based on a ratio of answered calls to call seizures, (ii) the predicted traffic, and (iii) the second threshold value of the ACD quality metric for the predicted traffic, wherein the ACD quality metric measures call duration per answered call.

At operation 701, route table generator 207 establishes the objective to be maximized, illustratively a profitability metric. Illustratively, the profitability metric to be optimized is a total margin value encompassing all the allocated calls according to the route table, i.e., the per-route margin-per-minute value multiplied by the total number of call-minutes allocated to the respective route. Notably, to maximize the total margin, it is preferable to allocate more call-minutes to high-margin routes and fewer calls to lower-margin routes, though, as explained, there are quality considerations that also come into play here.

At operation 703, route table generator 207 establishes one or more quality constraints. Illustratively, route table generator 207 establishes the first threshold of the ASR quality metric as a constraint here.

At operation 705, route table generator 207 establishes one or more traffic constraints. Illustratively, route table generator 207 establishes the predicted traffic for each distinct destination for the given time period, e.g., 1500 calls to destination A during hour 0900, and 2000 calls to destination B during the same hour 900.

At operation 707, route table generator 207 identifies the routes and/or the corresponding suppliers' telecommunication facilities that are candidates for the predicted traffic, e.g., routes 121-123 and 1021-1023 respectively.

At operation 709, route table generator 207 establishes one or more call-carrying capacity constraints for each of the candidate routes, e.g., 150 call-minutes for route 121, 200 call-minutes for route 122, etc. The units are in call-minutes, though other units can be used as the implementers see fit. The call-carrying capacity figures are obtained from historical data as explained earlier.

At operation 711, route table generator 207 obtains, for each candidate route, a cost characteristic and/or a profitability characteristic, such as a margin-per-call-minute value. Illustratively, route table generator 207 obtains a per-route margin-dollar-per-call-minute value for each candidate route.

Figure 10A:
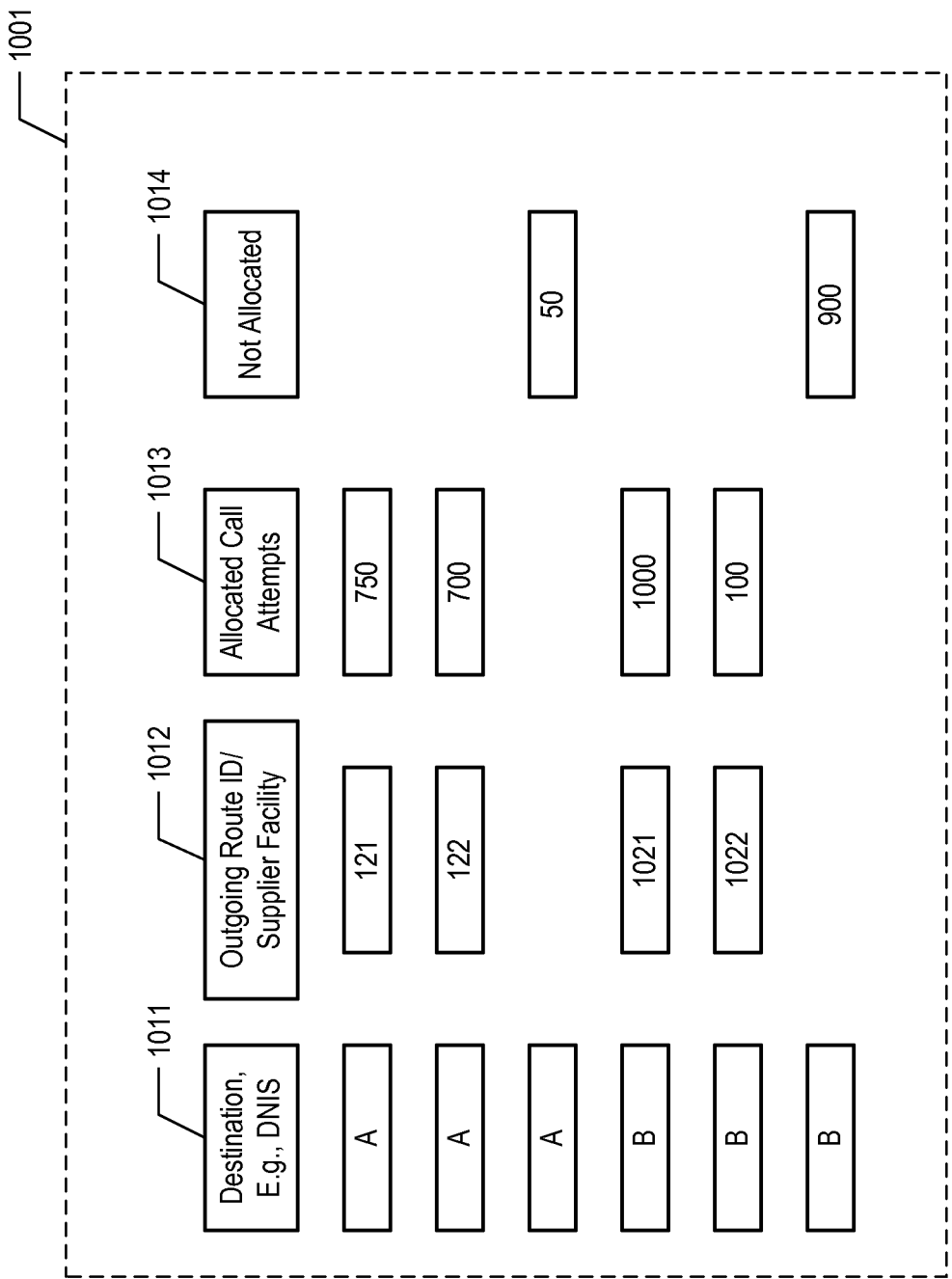
FIG. 10A depicts an illustrative initial route table 1001 generated according to operation 605 of the illustrative embodiment.

At operation 713, route table generator 207 executes a linear programming run that generates the route table based on the objective and subject to the constraints above; the resulting initial route table maximizes the objective and comprises at least one route chosen from the candidate routes to a destination such that at least some of the predicted traffic is allocated to the chosen route(s). Illustratively, FIG. 10A depicts an initial route table 1001 that comprises routes to destinations A and B. Notably, according to table 1001 generated under the existing objective and constraints, some of the predicted traffic to destination A could not be allocated to a route (50 call attempts), and likewise, some of the predicted traffic to destination B also could not be allocated to a route (900 call attempts). Control passes out of operation 605 to operation 607.

Figure 8:
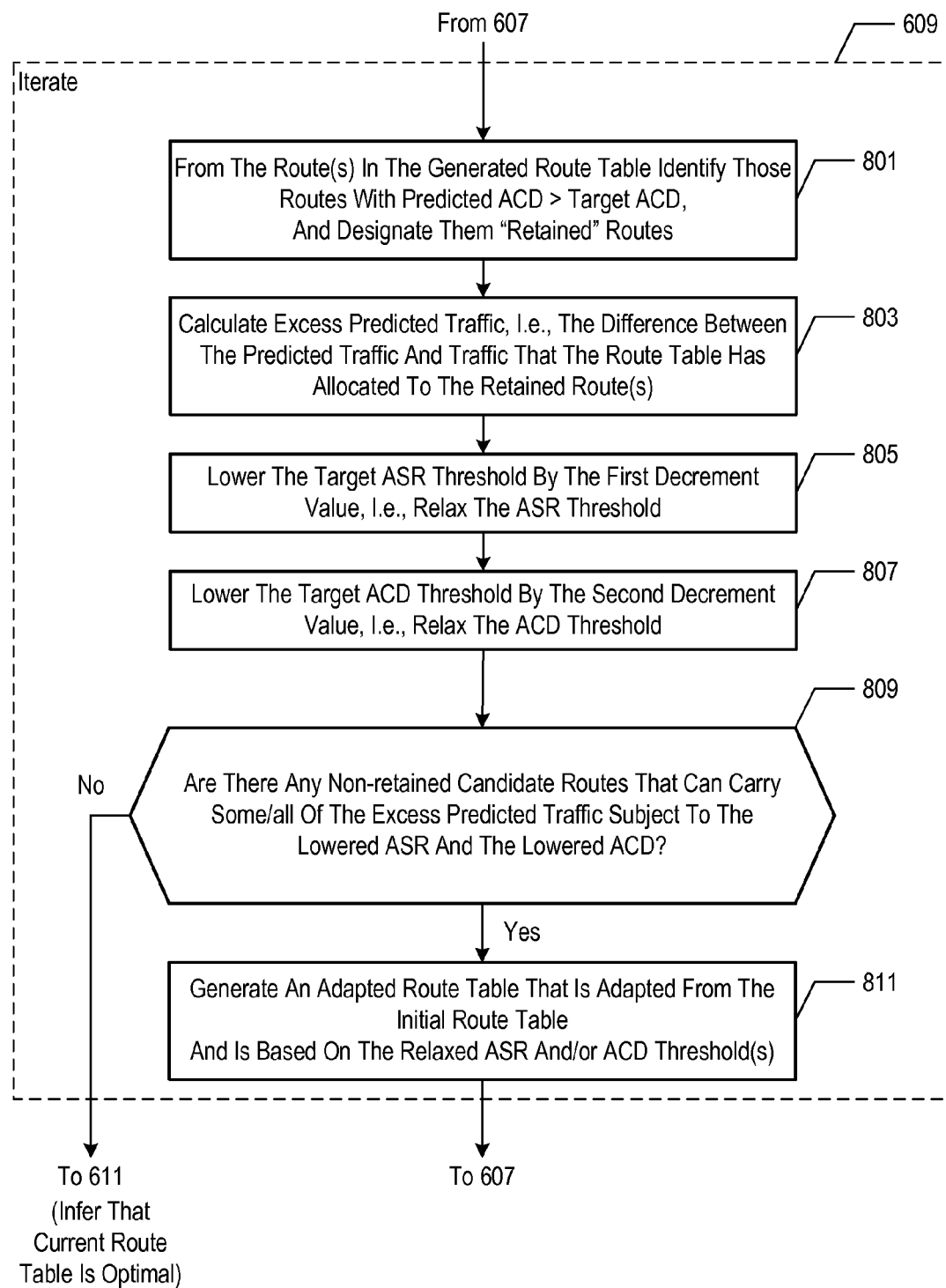
FIG. 8 depicts some salient sub-operations of operation 609 according to the illustrative embodiment.

FIG. 8 depicts some salient sub-operations of operation 609 according to the illustrative embodiment.

At operation 801, route table generator 207 identifies, from among the routes in the route table, those routes that have a predicted ACD value that exceeds the target ACD threshold currently in effect—any such route is designated a "retained" route.

At operation 803, route table generator 207 calculates a measure of "excess predicted traffic," which is defined as the difference between the total predicted traffic for the given time period and the traffic that the route table has allocated to the retained route(s). Another way of looking at "excess predicted traffic" is that it comprises predicted traffic that (i) is either allocated to a route which falls short of the target ACD threshold or (ii) is unallocated in the route table. The "excess predicted traffic" is analyzed further below to determine whether by relaxing the governing quality metric targets, i.e., ASR and ACD thresholds, the route table can be adapted to yield improved results.

At operation 808, route table generator 207 lowers the target ASR threshold by the first decrement value, illustratively decrementing 10% from 100%, resulting in a lowered target ASR threshold of 90% answer-seizure ratio. This operation relaxes the quality requirements for any non-retained routes that are candidates for the "excess predicted traffic."

At operation 807, route table generator 207 lowers the target ACD threshold by the second decrement value, illustratively decrementing 10% from 10 minutes, resulting in a lowered target ACD of 9 answered-call minutes. This operation relaxes the quality requirements for any non-retained routes that are candidates for the "excess predicted traffic."

At operation 809, route table generator 207 analyzes whether there any non-retained candidate routes that can carry some/all of the excess predicted traffic subject to the lowered ASR and the lowered ACD. This is determined by comparing the predicted ASR and the predicted ACD of a route against the lowered ASR and lowered ACD thresholds, respectively. When the answer is affirmative, route table generator 207 infers that the current route table can be adapted and control passes to operation 811. When the answer is negative, the present iterative operation (i.e., operation 609) ends and control passes out of operation 609 to operation 611 (where route table generator 207 infers that no further optimization of the current route table can be found).

Figure 9:
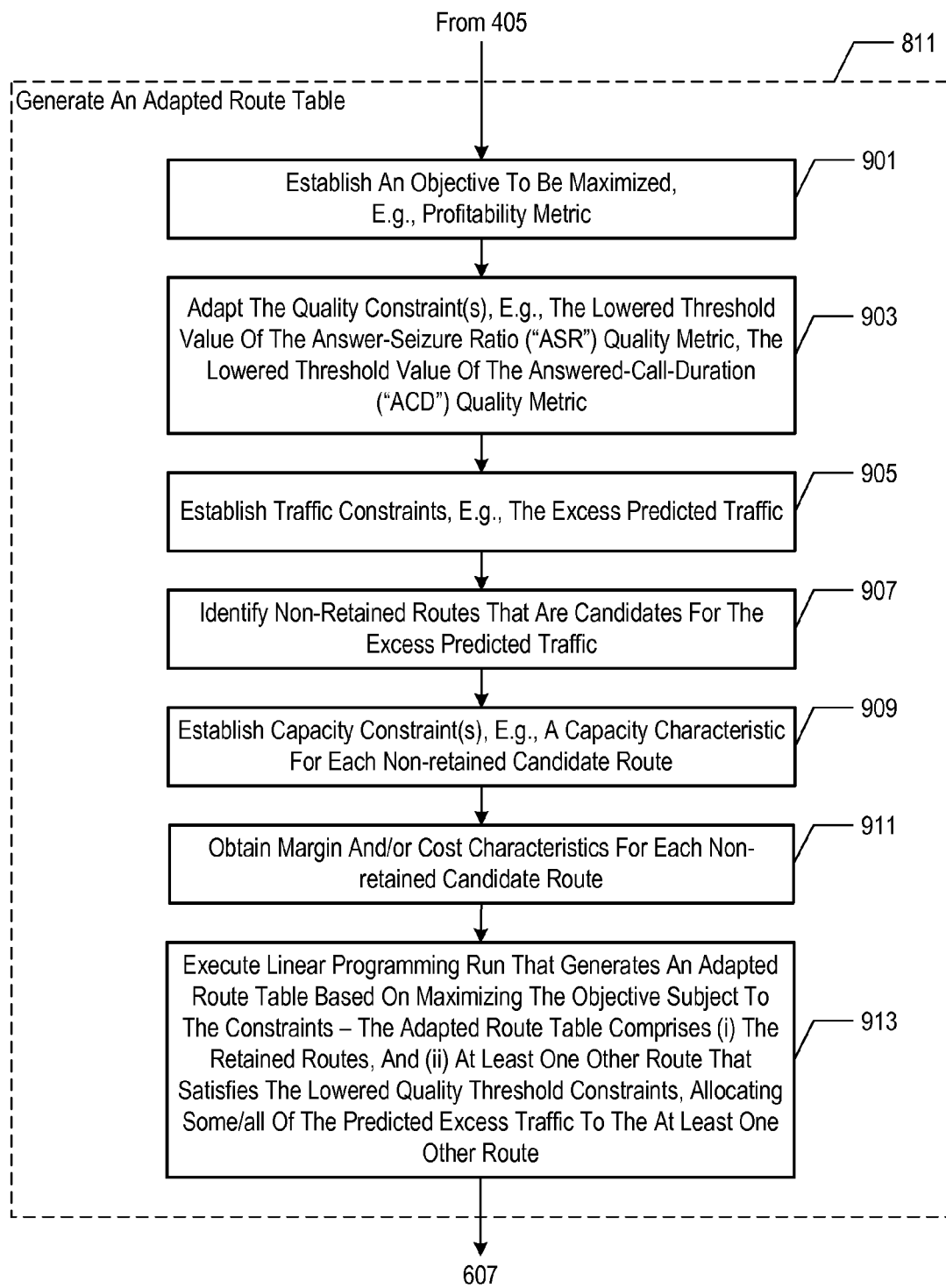
FIG. 9 depicts some salient sub-operations of operation 811 according to the illustrative embodiment.

FIG. 9 depicts some salient sub-operations of operation 811 according to the illustrative embodiment. Because the illustrative embodiment generates an adapted route table based on linear programming techniques, the present operation accordingly establishes the objective(s) to be maximized and the relevant constraints (including the quality metrics ASR and ACD and their supporting data) to apply to the execution of the linear programming run.

Although the illustrative embodiment generates an adapted route table based on linear programming that uses the objective and constraints set forth below, it will be clear to those having ordinary skill in the art, after reading the present disclosure, how to make and use alternative embodiments wherein the objective and/or the constraints differ while still remaining within the scope of the present invention. Likewise, it will be further clear to those having ordinary skill in the art, after reading the present disclosure, how to make and use alternative embodiments that generate the adapted route table without linear programming techniques such that the adapted route table maximizes a profitability metric for the predicted traffic based at least in part on (i) the lowered threshold value of the ASR quality metric for the predicted traffic, wherein the ASR quality metric is based on a ratio of answered calls to call seizures, (ii) the predicted traffic, and (iii) the lowered threshold value of the ACD quality metric for the predicted traffic, wherein the ACD quality metric measures call duration per answered call.

At operation 901, which resembles operation 701, route table generator 207 establishes the objective to be maximized, illustratively a profitability metric. Illustratively, the profitability metric to be optimized here is the same as the one in operation 701, which is a total margin value encompassing all the allocated calls during the given time period according to the route table, i.e., the per-route margin-per-minute value multiplied by the total number of call-minutes allocated to the respective route. It will be clear to those having ordinary skill in the art, after reading the present disclosure, how to make and use alternative embodiments that use a different maximization objective in operation 901 than used in operation 701.

At operation 903, route table generator 207 establishes one or more quality constraints. Illustratively, route table generator 207 establishes the lowered threshold of the ASR quality metric, and also the lowered threshold of the ACD quality metric as constraints here.

At operation 905, route table generator 207 establishes one or more traffic constraints. Illustratively, route table generator 207 establishes the "excess predicted traffic" for each distinct destination for the given time period as the constraint here.

At operation 907, route table generator 207 identifies the non-retained routes and/or the corresponding suppliers' telecommunication facilities that are candidates for the "excess predicted traffic."

At operation 909, route table generator 207 establishes one or more call-carrying capacity constraints for each of the non-retained candidate routes. As before, the units are in call-minutes, though other units can be used as the implementers see fit. The call-carrying capacity figures are obtained from historical data as explained earlier.

At operation 911, route table generator 207 obtains, for each non-retained candidate route, a cost characteristic and/or a profitability characteristic, such as a margin-per-call-minute value. Illustratively, route table generator 207 obtains a per-route margin-dollar-per-call-minute value for each non-retained candidate route.

Figure 10B:
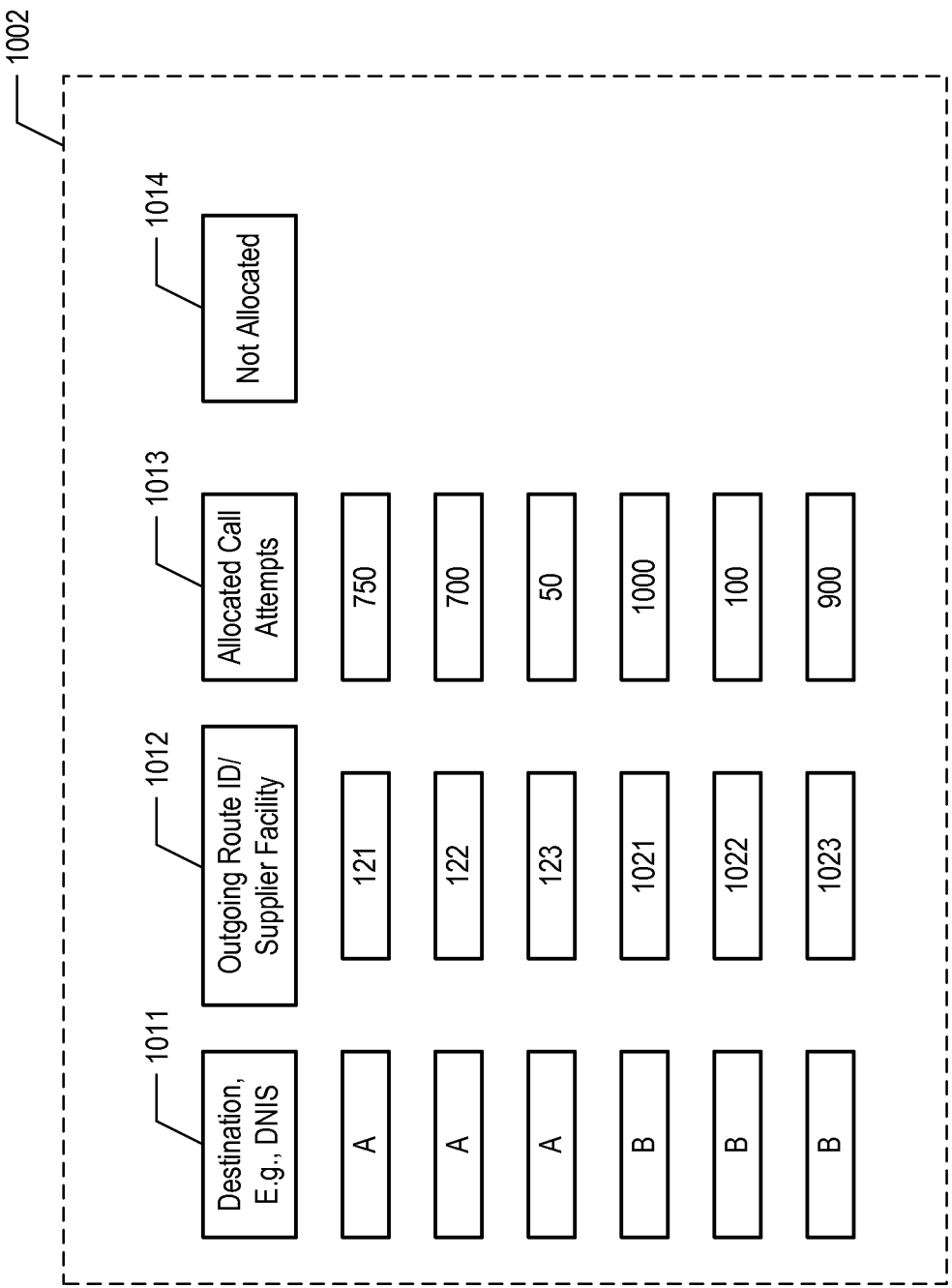
FIG. 10B depicts an illustrative adapted route table 1002 generated according to operation 811 of the illustrative embodiment.

At operation 913, route table generator 207 executes a linear programming run that generates the route table based on the objective and subject to the present constraints; the resulting adapted route table comprises (i) the retained routes, and (ii) at least one other route that satisfies the lowered quality threshold constraints, allocating some/all of the predicted excess traffic to the at least one other route. Illustratively, FIG. 10B depicts an adapted route table 1002 that comprises routes to destinations A and B. Notably, according to table 1002 generated under the present objective and more relaxed quality constraints, all the predicted traffic for the given time period has been allocated and no unallocated traffic remains. This result is to be contrasted with route table 1001 in FIG. 10A, where fewer routes were chosen for the route table and consequently traffic remained unallocated; when route table 1001 would have been applied to route actual calls, the chosen routes would have proven to lack sufficient call-carrying capacity for all the call attempts. In contrast, route table 1002 in FIG. 10B, has been adapted, based on relaxed quality constraints to have more routes that have sufficient call-carrying capacity for all the predicted traffic in the given time period. Notably, this is an iterative process that might require repeated iterations of operation 811 to successively relax the quality constraints and incrementally add more routes to carry the excess predicted traffic (or as much of it as feasible under the totality of constraints). Thus, the adapted table 1002 is an improvement over initial table 1001. Control passes from operation 811 to operation 607.

FIG. 10A depicts an illustrative initial route table 1001 generated according to operation 605 of the illustrative embodiment. The present figure was also discussed above. Table 1001 comprises columns 1011, 1012, 1013, and 1014.

Column 1011 lists the distinct destinations for the given period of time. Destination identifiers are well known in the art. Here, destinations A and B are depicted.

Column 1012 lists the route identifier or some corresponding supplier facility that can carry calls. Here, outgoing routes 121, 122, 1021, and 1022 are depicted.

Column 1013 lists the number of predicted call attempts allocated to each destination-route pair. Here, 750 call attempts are allocated to route 121 for destination A, 700 call attempts are allocated to route 122 for destination A, 1000 call attempts are allocated to route 1021 for destination B, and 100 call attempts are allocated to route 1022 for destination B.

Column 1014 lists the number of predicted call attempts for a destination that remain unallocated to an outgoing route. Here, 50 calls remain unallocated for destination A, and 900 calls remain unallocated for destination B.

FIG. 10B depicts an illustrative adapted route table 1002 generated according to operation 811 of the illustrative embodiment. The present figure was discussed in more detail above. Table 1002 comprises columns 1011, 1012, 1013, and 1014.

Column 1011 lists the distinct destinations for the given period of time. Here, destinations A and B are depicted.

Column 1012 lists the route identifier or some other supplier facility that can carry calls. Here, outgoing routes 121, 122, 123, 1021, 1022, and 1023 are depicted.

Column 1013 lists the number of predicted call attempts allocated to each destination-route pair. Here, 750 call attempts are allocated to route 121 for destination A (same as in table 1001), 700 call attempts are allocated to route 122 for destination A (same as in table 1001), and 50 call attempts are allocated to route 123 for destination A; 1000 call attempts are allocated to route 1021 for destination B (same as in table 1001), 100 call attempts are allocated to route 1022 for destination B (same as in table 1001), and 900 calls are allocated to route 1023 for destination B.

Column 1014 lists the number of predicted call attempts for a destination that remain unallocated to an outgoing route. Here, there are no unallocated predicted call attempts. The present table 1002 illustrates how the illustrative embodiment successfully blended particular quality considerations into the process of expanding the route choices in a route table, such that more calls can be successfully routed, subject to quality requirements, while retaining the operator's objective of maximizing profitability. As compared to table 1001, table 1002 allocates all predicted traffic. 950 more calls are allocated in table 1002 as compared to table 1001. Not only does this advantageously improve the call-handling capacity during the given time period, but additionally, because the routes in table 1002 were carefully chosen according to the ASR and ACD quality metrics and more calls are routed, the profitability of handling more calls is also improved, even if some of the routes in table 1002 have a lower margin than the originally-chosen routes in table 1001. Illustratively, the margin-per-minute value for outgoing route 123 is lower than for routes 121 and 122, and, the margin-per-minute value for outgoing route 1023 is lower than for routes 1021 and 1022; even so, these lower-margin routes have been auto-blended into the route table 1002 according to the illustrative ASR and ACD analysis.

Figure 11:
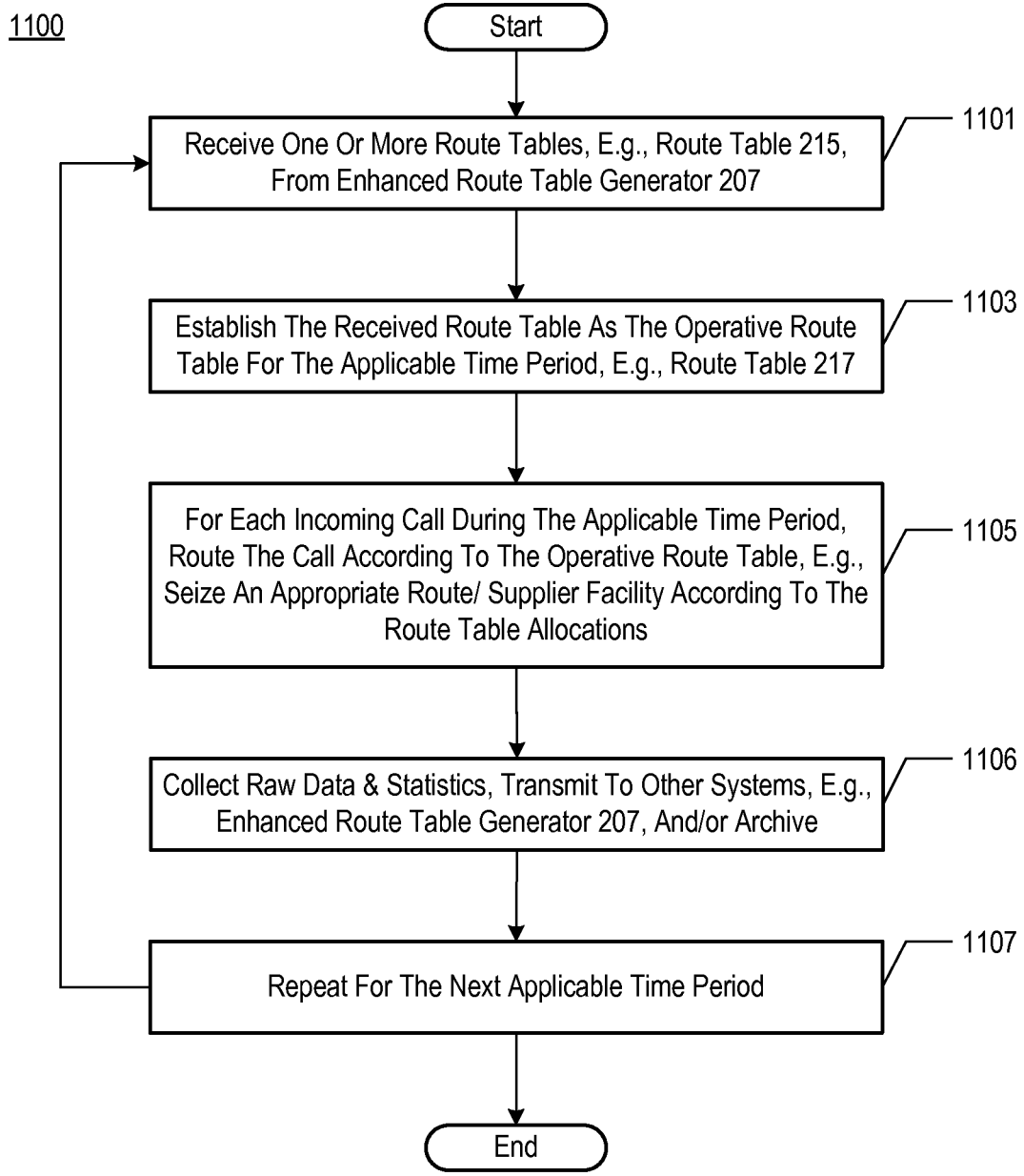
FIG. 11 depicts some salient operations of method 1100 according to the illustrative embodiment.

FIG. 11 depicts some salient operations of method 1100 according to the illustrative embodiment. Route server 209 is the entity within illustrative telecommunications system 200 that executes and coordinates the operations of method 1100 according to the illustrative embodiment of the call routing logic. Accordingly, telecommunications system 200 is responsible for both method 400 and method 1100. It will be clear to those having ordinary skill in the art, after reading the present invention, how to make and use alternative embodiments of the present invention wherein one unified apparatus comprises the functionality of route table generator 207 and route server 209, including the functionality of the quality auto-blend logic and the call routing logic; in such a unified embodiment, data is transferred internally.

At operation 1101, route server 209 receives one or more route tables from route table generator 207, for one or more time periods wherein the respective route tables are to be in effect. Illustratively, route server 209 receives route table 215 from route table generator 207.

At operation 1103, route server 209 established the received route table at the appropriate time as the operative route table for the applicable time period. Illustratively, route server 209 establishes the contents of route table 215 as the operative route table 217.

At operation 1105, during the applicable time period, e.g., the 0900 hour, route server 209 routes calls according to route table 217. Thus, for each incoming call during the 0900 hour, route server 209 places the call on an outgoing route as specified by route table 217 and the respective call allocations in route table 217. During call processing by the route server, the call allocations in the route table guide how actual calls are routed to which route in order to maintain the relative allocations in the route table. Because the route table is based on the ASR and ACD quality metrics as described in detail above, when the route server applies the route table to the processing of actual calls, the routing of calls is likewise based on the ASR and ACD quality metrics.

At operation 1106, route server 209 collects data about the ongoing traffic into and out of route server 209, optionally performs statistical analysis on the collected data, transmits the raw data and the statistical analysis to other systems (e.g., traffic predictors, route characterizers, route table generator 207, etc.), and also optionally archives the data for further retrieval and analysis. These techniques are well known in the art.

At operation 1107, route server 209 repeats the above-enumerated sub-operations for the next applicable time period, e.g., the 1000 hour.

In regard to method 1100, it will be clear to those having ordinary skill in the art, after reading the present disclosure, how to make and use alternative embodiments of method 1100 wherein the recited operations and sub-operations are differently sequenced, grouped, or sub-divided—all within the scope of the present invention. It will be further clear to those skilled in the art, after reading the present disclosure, how to make and use alternative embodiments of method 1100 wherein some of the recited operations and sub-operations are optional, are omitted, or are executed by other elements and/or systems, e.g., by route table generator 207, or by a unified element that both generates the route tables and routes call according thereto.

It is to be understood that the present disclosure teaches examples of the illustrative embodiment(s) and that many variations of the invention can be devised by those skilled in the art after reading this disclosure. The scope of the present invention is to be determined by the following claims.

What is claimed is:

1. A method comprising:
   receiving, by a telecommunications system, data representative of predicted traffic;
   generating, by the telecommunication system, a series of route tables for the predicted traffic, wherein a given route table in the series is a result of relaxing a target threshold for a first quality metric for the predicted traffic in relation to the target threshold that is used to generate the route table that precedes the given route table, wherein the first quality metric is based on a measure of quality of a route;
   relaxing, by the telecommunications system, the target threshold between each successive route table in the series until all of the predicted traffic is accommodated in a final route table in the series; and
   routing, by the telecommunications system, a plurality of calls according to the final route table.

2. The method of claim 1 wherein the first quality metric is based on a ratio of answered calls to call seizures.

3. The method of claim 1 wherein the final route table maximizes a profitability metric for the predicted traffic.

4. The method of claim 1 further comprising generating, by the telecommunications system, a first route table in the series of route tables for the predicted traffic, wherein the generating of the first route table is based at least in part on:
   (i) a first threshold value of the first quality metric for the predicted traffic,
   (ii) a capacity characteristic for each of a plurality of routes that are candidates for carrying the predicted traffic, and
   (iii) the predicted traffic; and
   wherein at least some of the predicted traffic is allocated in the first route table to one or more routes chosen from the plurality of candidate routes.

5. The method of claim 4 further comprising:
   for each route in the first route table, computing, by the telecommunication system, a predicted value of the first quality metric based on the first route table; and
   for each route in the first route table, computing, by the telecommunication system, a predicted value of a second quality metric based on the first route table, wherein the second quality metric measures call duration per answered call.

6. The method of claim 4 further comprising:
   for each route in the first route table, computing, by the telecommunication system, a predicted value of a second quality metric based on the first route table, wherein the second quality metric measures call duration per answered call;
   when a route from the first route table has a predicted value for the second quality metric that passes a second threshold for the second quality metric, designating the route a retained route;

when a route from the first route table has a predicted value for the second quality metric that does not pass the second threshold, generating a second route table in the series of route tables for the predicted traffic based at least in part on:
   (i) a third threshold value of the first quality metric that is lower than the first threshold value, and
   (ii) a fourth threshold value of the second quality metric that is lower than the second threshold value; and
wherein the second route table comprises (a) the retained routes from the first route table, and (b) at least one other route that has a predicted value of the second quality metric that passes the fourth threshold value and does not pass the second threshold value.

7. The method of claim 4 further comprising:
for each route in the first route table, computing, by the telecommunication system, a predicted value of a second quality metric based on the first route table, wherein the second quality metric measures call duration per answered call;
when a route from the first route table has a predicted value for the second quality metric that passes a second threshold for the second quality metric, designating the route a retained route;
when the retained routes lack sufficient capacity to carry the predicted traffic, generating a second route table in the series of route tables for the predicted traffic based at least in part on:
   (i) a third threshold value of the first quality metric that is lower than the first threshold value, and
   (ii) a fourth threshold value of the second quality metric that is lower than the second threshold value; and
wherein the second route table comprises (a) the retained routes from the first route table, and (b) at least one other route that is not a retained route.

8. The method of claim 4 further comprising:
when a route from the first route table has a predicted value for a second quality metric that does not pass a second threshold value, wherein the second quality metric measures call duration per answered call, generating, by the telecommunication system, a second route table that is based on the first route table and is further based on a relaxed threshold for at least one of (a) the first quality metric and (b) the second quality metric.

9. A system comprising:
a route table generator that is configured to:
   (i) receive data representative of predicted traffic,
   (ii) generate a series of route tables for the predicted traffic, wherein a given route table in the series is a result of relaxing a target threshold for a first quality metric for the predicted traffic in relation to the target threshold that is used to generate the route table that precedes the given route table, wherein the first quality metric is based on a measure of quality of a route, and
   (iii) relax the target threshold between each successive route table in the series until all of the predicted traffic is accommodated in a final route table in the series; and
a route server that is configured to route a plurality of calls according to the final route table.

10. The system of claim 9 wherein the first quality metric is based on a ratio of answered calls to call seizures.

11. The system of claim 9 wherein the final route table maximizes a profitability metric for the predicted traffic.

12. The system of claim 9 wherein the route table generator is further configured to generate a first route table in the series of route tables for the predicted traffic, based at least in part on:
   (i) a first threshold value of the first quality metric for the predicted traffic, and
   (ii) a capacity characteristic for each of a plurality of routes that are candidates for carrying the predicted traffic, and
   (iii) the predicted traffic; and
wherein at least some of the predicted traffic is allocated in the first route table to one or more routes chosen from the plurality of candidate routes.

13. The system of claim 9 wherein the route table generator is further configured to:
   (i) compute, for each route in the first route table, a predicted value of the first quality metric based on the first route table, and
   (iii) compute, for each route in the first route table, a predicted value of a second quality metric based on the first route table, wherein the second quality metric measures call duration per answered call.

14. The system of claim 9 wherein the route table generator is further configured to:
   (i) compute, for each route in the first route table, a predicted value of a second quality metric based on the first route table, wherein the second quality metric measures call duration per answered call,
   (ii) when a route from the first route table has a predicted value for the second quality metric that passes a second threshold for the second quality metric, designate the route a retained route, and
   (iii) when a route from the first route table has a predicted value for the second quality metric that does not pass the second threshold, generate a second route table in the series of route tables for the predicted traffic based at least in part on:
      (a) a third threshold value of the first quality metric that is lower than the first threshold value, and
      (b) a fourth threshold value of the second quality metric that is lower than the second threshold value, and
   wherein the second route table comprises (i) the retained routes from the first route table, and (ii) at least one other route that has a predicted value of the second quality metric that passes the fourth threshold value and does not pass the second threshold value.

15. The system of claim 9 wherein the route table generator is further configured to:
   (i) for each route in the first route table, compute a predicted value of a second quality metric based on the first route table, wherein the second quality metric measures call duration per answered call,
   (ii) when a route from the first route table has a predicted value for the second quality metric that passes a second threshold for the second quality metric, designate the route a retained route,
   (iii) when the retained routes lack sufficient capacity to carry the predicted traffic, generate a second route table in the series of route tables for the predicted traffic based at least in part on:
      (a) a third threshold value of the first quality metric that is lower than the first threshold value, and
      (b) a fourth threshold value of the second quality metric that is lower than the second threshold value, and
   wherein the second route table comprises (i) the retained routes from the first route table, and (ii) at least one other route that is not a retained route.

16. The system of claim 9 wherein the route table generator is further configured to:

when a route from the first route table has a predicted value for a second quality metric that does not pass a second threshold value, wherein the second quality metric measures call duration per answered call, generate a second route table that is based on the first route table and is further based on a relaxed threshold for at least one of (a) the first quality metric and (b) the second quality metric.

17. A method comprising:

receiving, by a telecommunications system, data representative of predicted traffic;

generating, by the telecommunications system, a first route table for the predicted traffic, wherein the generating of the first route table is based at least in part on:
  (i) a capacity characteristic for each of a plurality of routes that are candidates for carrying the predicted traffic, and
  (ii) the predicted traffic;

generating, by the telecommunication system, a series of route tables for the predicted traffic subsequent to the generating of the first route table, wherein a given route table in the series is a result of relaxing a target threshold for a first quality metric for the predicted traffic in relation to the target threshold that is used to generate the route table that precedes the given route table;

relaxing, by the telecommunications system, the target threshold between each successive route table in the series until all of the predicted traffic is accommodated in a final route table in the series; and routing, by the telecommunications system, a plurality of calls according to the final route table.

18. The method of claim 17 wherein the generating of the first route table is based at least in part on a first threshold value of the first quality metric for the predicted traffic, and wherein at least some of the predicted traffic is allocated in the first route table to one or more routes chosen from the plurality of candidate routes.

19. The method of claim 17 wherein the first quality metric is based on (i) a measure of quality of a route and (ii) a ratio of answered calls to call seizures.

20. The method of claim 17 wherein the first route table maximizes a profitability metric for the predicted traffic.

\* \* \* \* \*